US012644571B1

(12) United States Patent
Lin

(10) Patent No.: US 12,644,571 B1
(45) Date of Patent: Jun. 2, 2026

(54) SOLAR-POWERED POOL WALL-MOUNTED LIGHT AND SOLAR-POWERED POOL SYSTEM

(71) Applicant: Shenzhen Laimi Wisdom Nexus Technology Co., Ltd., Shenzhen (CN)

(72) Inventor: Zhipei Lin, Shenzhen (CN)

(73) Assignee: Shenzhen Laimi Wisdom Nexus Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/449,259

(22) Filed: Jan. 14, 2026

(30) Foreign Application Priority Data

Dec. 18, 2025 (CN) ......................... 202522704464.7

(51) Int. Cl.

| | |
|---|---|
| ***F21L 4/04*** | (2006.01) |
| ***F21L 4/08*** | (2006.01) |
| ***F21V 21/088*** | (2006.01) |
| ***F21V 21/14*** | (2006.01) |
| ***F21V 21/30*** | (2006.01) |
| ***F21V 21/34*** | (2006.01) |
| ***F21V 23/00*** | (2015.01) |
| ***F21V 23/04*** | (2006.01) |
| ***F21W 131/401*** | (2006.01) |
| ***F21Y 115/10*** | (2016.01) |

(52) U.S. Cl.

CPC *F21L 4/04* (2013.01); *F21L 4/08* (2013.01); *F21V 21/0885* (2013.01); *F21V 21/145* (2013.01); *F21V 21/30* (2013.01); *F21V 21/34* (2013.01); *F21V 23/002* (2013.01); *F21V 23/006* (2013.01); *F21V 23/0414* (2013.01); *F21W 2131/401* (2013.01); *F21Y 2115/10* (2016.08)

(58) Field of Classification Search

CPC ...... F21L 4/00–085; F21V 21/00–0965; F21V 21/14–35; F21V 23/00–06; F21V 31/00–04; F21W 2131/401; F21Y 2115/00

See application file for complete search history.

(56) References Cited

U.S. PATENT DOCUMENTS

| | | | | |
|---|---|---|---|---|
| 10,890,007 B2 * | 1/2021 | Foy | F21V 33/006 | |
| 12,565,972 B1 * | 3/2026 | Zhao | F21S 9/035 | |
| 2007/0247838 A1 * | 10/2007 | Fan | F21S 9/032 | 362/267 |

* cited by examiner

*Primary Examiner* — Jason M Han

(74) *Attorney, Agent, or Firm* — Westbridge IP LLC

(57) ABSTRACT

A solar-powered pool wall-mounted light includes a fixed base, a solar panel, a lighting assembly, and a flexible electrical connector. The fixed base has a mounting surface and a first channel extending from an interior of the fixed base to the mounting surface. The solar panel is mounted on the mounting surface and exposed outside the swimming pool. The lighting assembly includes a housing and a lighting lamp set arranged on the housing. At least a portion of the lighting assembly extends into the swimming pool. The housing has a second channel connecting the lighting lamp set to an exterior of the housing. One end of the flexible electrical connector is connected to the solar panel, and the other end is electrically connected to the lighting lamp set. The housing is rotatably connected to the fixed base.

18 Claims, 21 Drawing Sheets

SOLAR-POWERED POOL WALL-MOUNTED LIGHT AND SOLAR-POWERED POOL SYSTEM

CROSS-REFERENCE TO RELATED APPLICATIONS

This application claims priority to Chinese Patent Application No. 202522704464.7, filed on Dec. 18, 2025, the content of which is incorporated herein by reference in its entirety.

TECHNICAL FIELD

The present disclosure relates to the field of pool lighting technology, and more particularly, to a solar-powered pool wall-mounted light and a solar-powered pool system.

BACKGROUND

Swimming pools are designed for swimming sports or aquatic recreation. However, activities in the swimming pool can be hampered by poor visibility at night or under dim lighting conditions.

To address this, swimming pool lights have been created to illuminate the swimming pools. Existing swimming pool lights in the related art typically rely on one of two power sources: batteries or mains electricity. Battery-powered lights involve tedious battery replacement, while lights powered by mains electricity require complex wiring.

As a result, solar power has been considered for swimming pool lights in the related art. However, the configuration of solar panels often results in a larger overall size of the swimming pool light, which makes the transportation and storage of the swimming pool light very inconvenient, thereby inconveniencing users.

SUMMARY

The primary objective of the present disclosure is to provide a solar-powered pool wall-mounted light, aiming to facilitate the storage and transportation of the solar-powered pool wall-mounted light.

To achieve the above objectives, the solar-powered pool wall-mounted light provided in the present disclosure includes:

- a fixed base, configured to be secured to an edge of a swimming pool, including a mounting surface and a first channel extending from an interior of the fixed base to the mounting surface;
- a solar panel mounted on the mounting surface, and the solar panel being exposed outside the swimming pool when the solar pool wall-mounted light is in operation;
- a lighting assembly, including a housing and a lighting lamp set arranged inside the housing, at least a portion of the lighting assembly being configured to extend into the swimming pool to provide illumination, and the housing having a second channel connecting the lighting lamp set to an exterior of the housing;
- a flexible electrical connector with one end thereof being connected to the solar panel through the first channel and the other end thereof being electrically connected to the lighting lamp set through the second channel;
- wherein the housing is rotatably connected to the fixed base, allowing the solar-powered pool wall-mounted light to have both an expanded state and a folded state; when the solar-powered pool wall-mounted light is in the expanded state, the housing is substantially perpendicular to the mounting surface; when the solar-powered pool wall-mounted light is in the folded state, the housing is substantially parallel with the mounting surface, thereby reducing a space enclosed by the fixed base and the lighting assembly.

The present disclosure further provides a solar-powered pool wall-mounted light, including:

- a fixed base, configured to be secured to an edge of a swimming pool, including a mounting surface and a first channel extending from an interior of the fixed base to the mounting surface;
- a solar panel being mounted on the mounting surface and being exposed outside the swimming pool when the solar-powered pool wall-mounted light is in operation;
- a lighting assembly, including a housing and a lighting lamp set arranged inside the housing, wherein the lighting lamp set is configured to extend into the swimming pool to provide illumination, and the housing has a second channel connecting the lighting lamp set to an exterior of the housing;
- a flexible electrical connector, one end of which is connected to the solar panel through the first channel, and the other end of which is electrically connected to the lighting lamp set through the second channel;
- the housing includes a first housing and a second housing; the first housing is connected to the fixed base, while the second housing is movably connected to the first housing, allowing the second housing to extend and retract along a length direction of the first housing;
- the lighting lamp set is arranged inside the second housing and is capable of moving as the second housing extends or retracts, such that a depth at which the lighting lamp set extends into the swimming pool can be adjusted; or
- wherein the lighting assembly includes a control switch, a button board, and a light panel assembly; the button board is electrically connected to the control switch and the light panel assembly, and the control switch controls the light panel assembly through the button board; the control switch and the button board are mounted on the first housing, and the light panel assembly is mounted on the second housing, such that the light panel assembly is capable of moving as the second housing extends and retracts, allowing a depth at which the light panel assembly extends into the swimming pool to be adjusted.

The present disclosure further provides a solar-powered pool system, including a swimming pool and the above solar-powered pool wall-mounted light, wherein the solar-powered pool wall-mounted light is mounted at the edge of the swimming pool.

The solar-powered pool wall-mounted light of the present disclosure includes the fixed base and the lighting assembly. The solar panel is mounted on the mounting surface of the fixed base, and the lighting assembly includes the housing and the lighting lamp set arranged inside the housing. The flexible electrical connector is configured to connect the solar panel and the lighting lamp set through the first channel and the second channel, allowing the lighting lamp set to be powered by the solar panel. Such configuration not only eliminates the need for frequent battery replacements but also avoids the requirement of running power cables to the wall light, significantly improving the convenience of using the solar-powered pool wall-mounted light. Furthermore, the housing is rotatably connected to the fixed base, and the flexible electrical connector passes through the connection position between the housing and the fixed base. This configuration allows the solar-powered pool wall-mounted light to have both the extended state and the folded state. The switching between the two states does not affect the electrical connection between the solar panel and the lighting lamp set. When the solar-powered pool wall-mounted light is in the expanded state, the fixed base can be conformally secured to the edge of the swimming pool, allowing the solar panel to face the sky and absorb solar energy. Meanwhile, at least a portion of the lighting assembly can extend into the swimming pool to provide illumination. When the solar-powered pool wall-mounted light is in the folded state, the solar-powered pool wall-mounted light occupies significantly less space compared to the expanded state. This greatly reduces the likelihood of damage to the fixed base and the lighting assembly from accidental external impacts. Furthermore, the solar-powered pool wall-mounted light in the folded state is more convenient for user storage and occupies minimal space during transportation, thereby facilitating the storage and transportation of the solar-powered pool wall-mounted light.

BRIEF DESCRIPTION OF THE DRAWINGS

To more clearly illustrate the technical solutions in the embodiments of the present disclosure or the prior art, the accompanying drawings required for the description of the embodiments or the prior art will be briefly introduced below. It is evident that the accompanying drawings described below are merely some embodiments of the present disclosure. For those skilled in the art, other drawings can be obtained based on the structures shown in these accompanying drawings without creative effort. In the drawings.

Figure 1:
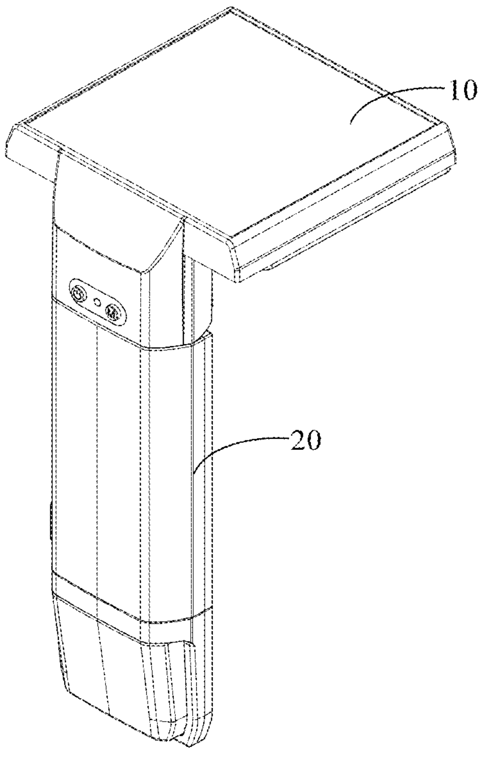
FIG. 1 is a schematic view of a solar-powered pool wall-mounted light in accordance with an embodiment of the present disclosure.
Figure 2:
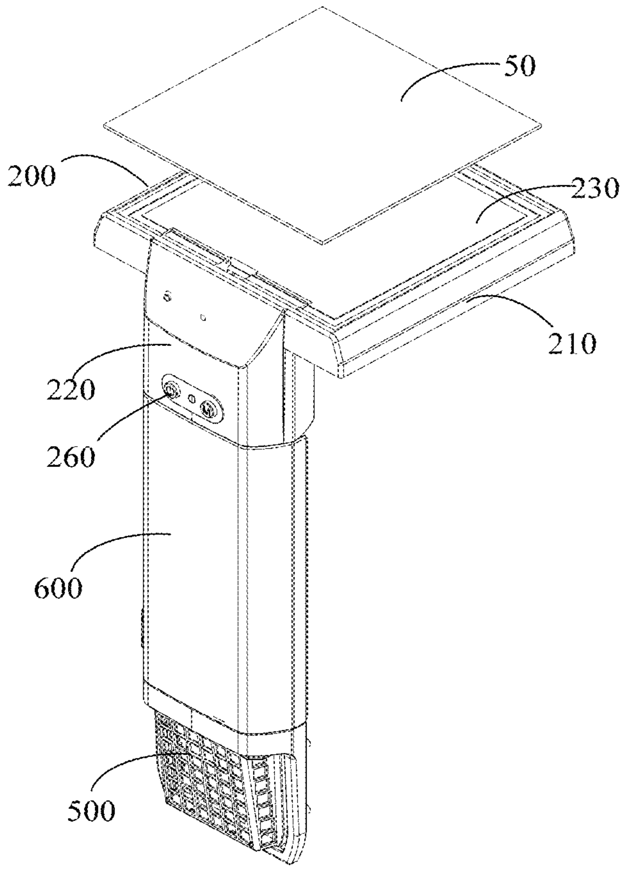
FIG. 2 is a partially exploded view of FIG. 1.
Figure 3:
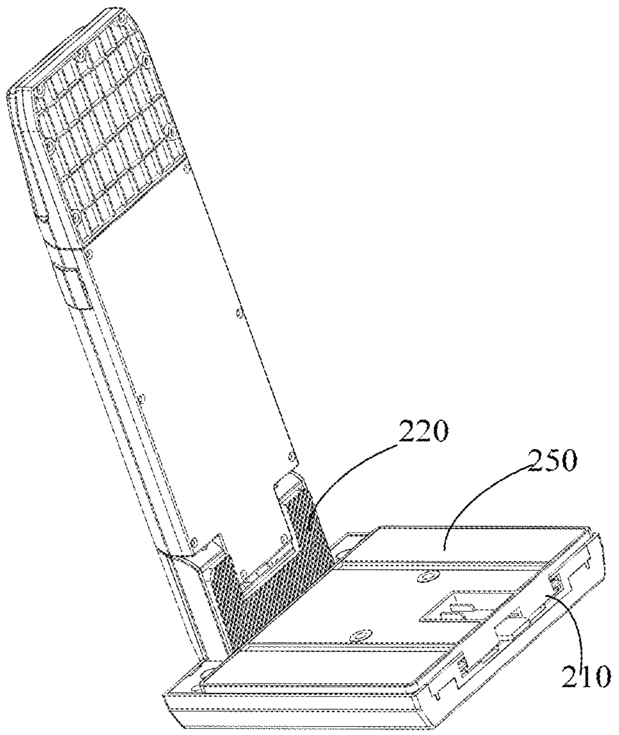
FIG. 3 is a schematic view of a solar-powered pool wall-mounted light in accordance with another embodiment of the present disclosure.

The realization of the purpose, functional features, and advantages of the present disclosure will be further explained in conjunction with the embodiments and with reference to the accompanying drawings.

DETAILED DESCRIPTION OF THE EMBODIMENTS

To make the objectives, technical solutions, and advantages of the embodiments of the present disclosure clearer, the technical solutions in the embodiments of the present disclosure will be described clearly and comprehensively below in conjunction with the accompanying drawings. Obviously, the described embodiments are only a part of the embodiments of the present disclosure, not all of them. Based on the embodiments of the present disclosure, all other embodiments obtained by those of ordinary skill in the art without creative effort fall within the scope of protection of the present disclosure.

It should be noted that all directional indications (such as up, down, left, right, front, and back) in the embodiments of the present disclosure are only used to explain the relative positional relationships and motion conditions between various components in a specific posture (as shown in the accompanying drawings). If the specific posture changes, the directional indications will also change accordingly.

In addition, the descriptions involving "first", "second", etc. in the present disclosure are only used for descriptive purposes and cannot be understood as indicating or implying their relative importance or implicitly specifying the number of technical features indicated. Therefore, features defined as "first" or "second" may explicitly or implicitly include at least one such feature. Furthermore, "and/or" throughout the text includes three options, taking A and/or B as an example, including the technical solution of A, the technical solution of B, and the technical solution where both A and B are satisfied simultaneously. Additionally, technical solutions between various embodiments can be combined with each other, but this must be based on what ordinary technical personnel in the field can achieve. When the combination of technical solutions is contradictory or unachievable, it should be considered that such combination of technical solutions does not exist and is not within the scope of protection claimed in the present disclosure.

The present disclosure provides a solar-powered pool wall-mounted light, which is primarily used in a solar-powered pool system to facilitate the storage of the solar-powered pool wall-mounted light. The solar-powered pool system refers to a pool system that includes a swimming pool, a pool purification system, pool accessories, and the solar-powered pool wall-mounted light.

The following will primarily describe the specific structure of the solar-powered pool wall-mounted light.

Referring to FIGS. 1 to 9, in an embodiment of the present disclosure, the solar-powered pool wall-mounted light includes a fixed base 10, a solar panel 50, a light assembly 20, and a flexible electrical connector 30.

The fixed base 10 is configured to be secured to an edge of the swimming pool. The fixed base 10 has a mounting surface 230 and a first channel 270, and the first channel 270 extends from an interior of the fixed base to the mounting surface 230.

The solar panel 50 is mounted on the mounting surface 230. The solar panel 50 is exposed outside the swimming pool when the solar-powered pool wall-mounted light is in operation.

The lighting assembly 20 includes a housing 600 and a lighting lamp set 500 arranged inside the housing 600. At least a portion of the lighting assembly 20 is configured to extend into the swimming pool to provide illumination. The housing 600 has a second channel 550 connecting the lighting lamp set 500 to an exterior of the housing 600.

One end of the flexible electrical connector 30 is connected to the solar panel 50 through the first channel 270, and the other end of the flexible electrical connector 30 is electrically connected to the lighting lamp set 500 through the second channel 550.

The housing 600 is rotatably connected to the fixed base 10, allowing the solar-powered pool wall-mounted light to have an expanded state and a folded state. When the solar-powered pool wall-mounted light is in the expanded state, the housing 600 is substantially perpendicular to the mounting surface 230.

When the solar-powered pool wall-mounted light is in the folded state, the housing 600 is substantially parallel with the mounting surface 230, thereby reducing a space enclosed by the fixed base 10 and the lighting assembly 20.

In this embodiment, the edge of the swimming pool also refers to an inner wall of the swimming pool, an outer wall of the swimming pool, and a surrounding area of the edge of the swimming pool. The fixed base 10 can be secured to the edge of the swimming pool by clamping, fasteners, or adhesive, which is not specifically limited herein. The mounting surface 230 is a flat surface, and the mounting surface 230 is exposed on the fixed base 10. When the solar panel 50 is mounted on the mounting surface 230, the solar panel 50 is exposed, allowing the solar panel 50 to absorb solar energy. The first channel 270 may have various forms, which is not specifically limited herein, provided that the first channel 270 connects the mounting surface 230 to the exterior of the fixed base 10. Such configuration allows the flexible electrical connector 30 to extend from the solar panel 50 to the lighting assembly 20.

The shape and number of the solar panel 50 can be varied. The number of the solar panel can be one, two, or multiple; the shape of the solar panel 50 can be a flat panel, a folded panel, or an arc panel, etc., which is not specifically limited herein. Taking the flat solar panel 50 as an example, after the solar panel 50 is mounted on the mounting surface 230, a back side of the solar panel 50 is in communication with the first channel 270 through holes, such that the flexible electrical connector 30 can extend from the first channel 270 to be electrically connected to the solar panel 50.

The housing 600 of the lighting assembly 20 may have various forms, such as an elongated strip, square, spherical, and ellipsoidal shape, which is not specifically limited herein. Taking an elongated strip as an example, the housing 600 may be either an independent single housing or formed by combining multiple housings which are fixedly connected together or movable relative to each other. The housing 600 defines an installation space, and the lighting lamp set 500 is arranged inside the housing 600. The lighting lamp set 500 includes a light source (e.g., an LED bead). A portion of the housing 600 corresponding to the light source is made of a light-transmitting material, allowing light emitted from the light source to pass through and exit the housing 600. At least a portion of the lighting lamp set 500 extends into the swimming pool to provide illumination inside the swimming pool. The form and shape of the second channel 550 may also be varied, and are not specifically limited herein, provided that the second channel has a spatial structure through which the flexible electrical connector 30 can pass.

The flexible electrical connector 30 is a flexible body capable of transmitting electrical signals and/or power, such as wires and flexible circuit boards. The flexible electrical connector 30 can be bent and twisted to be applied in complex electrical connection paths. The flexible electrical connector 30 can be connected to the solar panel 50 and the lighting lamp set 500 in many ways, such as through direct electrical connection. In some embodiments, the flexible electrical connector 30 can be connected to the solar panel 50 and the lighting lamp set 500 through indirect electrical connection; for example, the flexible electrical connector 30 can be connected to the solar panel 50 and the lighting lamp set 500 via a control switch 510, a button board 520, and a circuit board, which is not specifically limited herein, provided that the electrical energy converted by the solar panel 50 can be transmitted to the lighting lamp set 500 through the flexible electrical connector 30.

The housing 600 is rotatably connected to the fixed base 10, such as through pivot connection and hinge connection, which is not specifically limited herein. Taking the pivot connection as an example, when the solar-powered pool wall-mounted light is in the expanded state, the housing 600 is substantially perpendicular to the mounting surface 230, meaning that an angle between the housing 600 and the mounting surface 230 is approximately 90 degrees, with a deviation of 5 degrees or less allowed. For example, the angle between the housing 600 and the mounting surface 230 can be 85 degrees to 95 degrees. In some embodiments, a deviation of 10 degrees or less is even allowed; for example, the angle between the housing 600 and the mounting surface 230 can be 80 degrees to 90 degrees. It can be understood that when the solar-powered pool wall-mounted light is in the expanded state, the solar panel 50 mounted on the mounting surface 230 can face the sky to absorb solar energy, while at least a portion of the lighting assembly 20 can extend downward into the swimming pool to provide illumination. When the solar-powered pool wall-mounted light is in the folded state, the housing 600 is substantially parallel with the mounting surface 230, meaning that the “parallelism” between the housing 600 and the mounting surface 230 allows a deviation of 5 degrees or less; for example, the angle between the housing 600 and the mounting surface 230 can be −5 degrees to 5 degrees. In some embodiments, a deviation of 10 degrees or less is even allowed; for example, the angle between the housing 600 and the mounting surface 230 can be −10 degrees to 10 degrees. That is, when the solar-powered pool wall-mounted light is in the folded state, the angle between the housing 600 and the mounting surface 230 is significantly reduced. In this way, the space formed by enclosing the housing 600 and the mounting surface 230 is significantly reduced, thereby significantly reducing the space occupied by the solar-powered pool wall-mounted light in the folded state.

In this embodiment, the solar-powered pool wall-mounted light of the present disclosure includes the fixed base and the lighting assembly. The solar panel is mounted on the mounting surface of the fixed base, and the lighting assembly includes the housing and the lighting lamp set arranged inside the housing. The flexible electrical connector is configured to connect the solar panel and the lighting lamp set through the first channel and the second channel, allowing the lighting lamp set to be powered by the solar panel. Such configuration not only eliminates the need for frequent battery replacements but also avoids the requirement of running power cables to the wall light, significantly improving the convenience of using the solar-powered pool wall-mounted light. Furthermore, the housing is rotatably connected to the fixed base, and the flexible electrical connector passes through the connection position between the housing and the fixed base. This configuration allows the solar-powered pool wall-mounted light to have both the extended state and the folded state. The switching between the two states does not affect the electrical connection between the solar panel and the lighting lamp set. When the solar-powered pool wall-mounted light is in the expanded state, the fixed base can be conformally secured to the edge of the swimming pool, allowing the solar panel to face the sky and absorb solar energy. Meanwhile, at least a portion of the lighting assembly can extend into the swimming pool to provide illumination. When the solar-powered pool wall-mounted light is in the folded state, the solar-powered pool wall-mounted light occupies significantly less space compared to the expanded state. This greatly reduces the likelihood of damage to the fixed base and the lighting assembly from accidental external impacts. Furthermore, the solar-powered pool wall-mounted light in the folded state is more convenient for user storage and occupies minimal space during transportation, thereby facilitating the storage and transportation of the solar-powered pool wall-mounted light.

In some embodiments, to ensure the stability of the electrical connection between the solar panel 50 and the lighting lamp set 500, the flexible electrical connector 30 can have various forms at the connection position between the housing 600 and the fixed base 10. Specific descriptions are provided below. For ease of description in subsequent embodiments, the portion of the flexible electrical connector 30 at the connection position between the housing 600 and the fixed base 10 is defined as a connecting segment.

When an extension direction of the connecting segment is the same as a length direction of the housing 600, the connecting segment is extended when the solar-powered pool wall-mounted light is in the expanded state, and is bent when the solar-powered pool wall-mounted light is in the folded state.

When the extension direction of the connecting segment is the same as a width direction or a thickness direction of the housing 600, the connecting segment is twisted in a first direction when the solar-powered pool wall-mounted light is in the expanded state; and is twisted in a second direction when the solar-powered pool wall-mounted light is in the folded state. The first and second directions are opposite directions, such as clockwise and counterclockwise.

Figure 4:
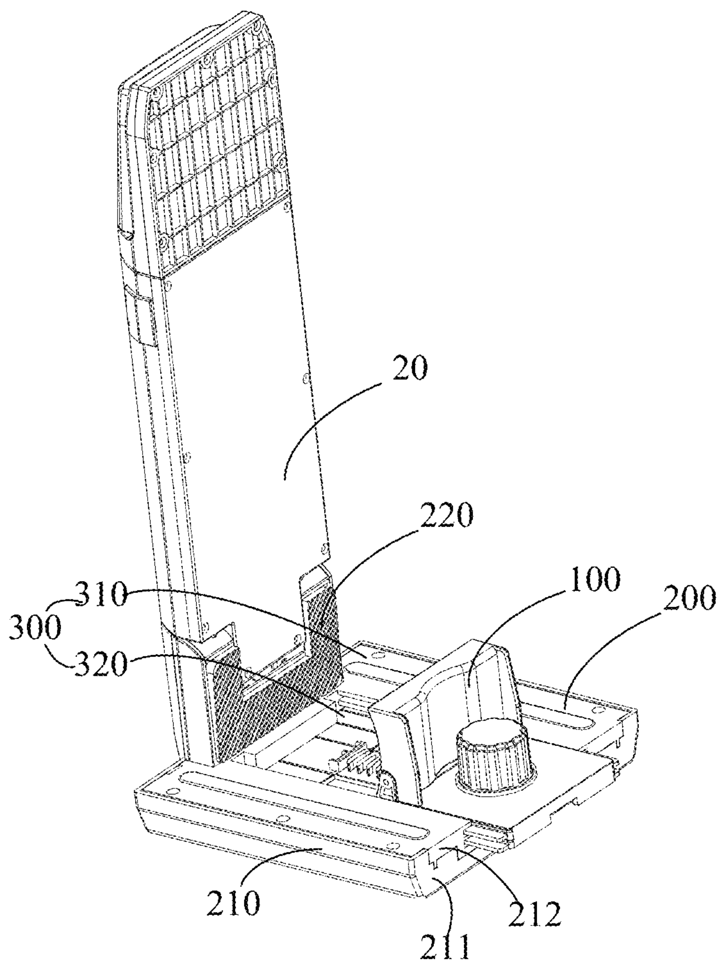
FIG. 4 is a schematic view of a solar-powered pool wall-mounted light in accordance with yet another embodiment of the present disclosure.
Figure 5:
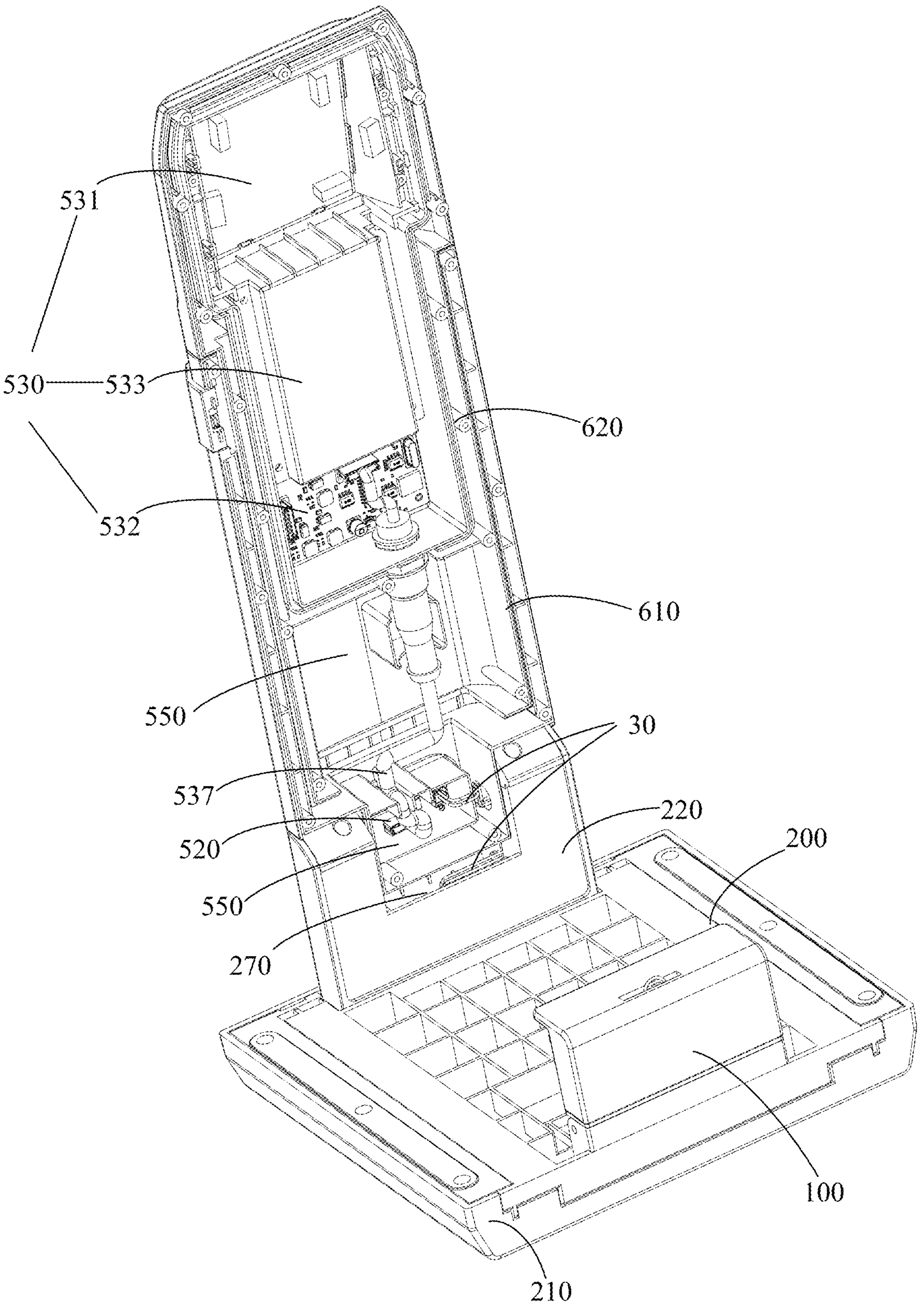
FIG. 5 is a schematic view of a solar-powered pool wall-mounted light in accordance with further another the present disclosure.
Figure 6:
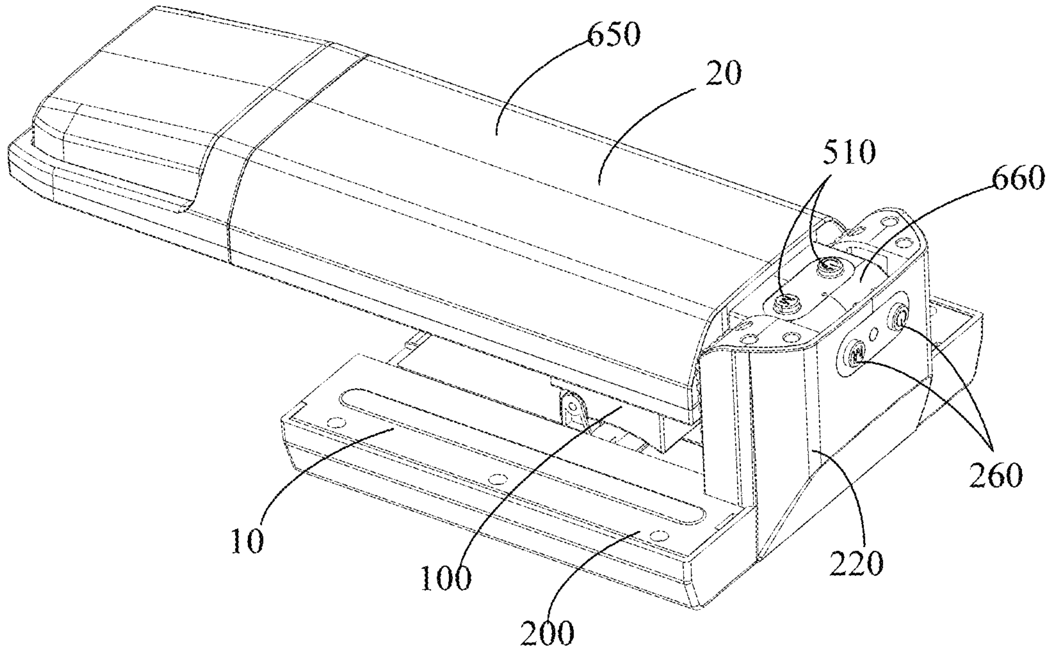
FIG. 6 is a schematic view of the solar-powered pool wall-mounted light in a folded state in accordance with an embodiment of the present disclosure.
Figure 7:
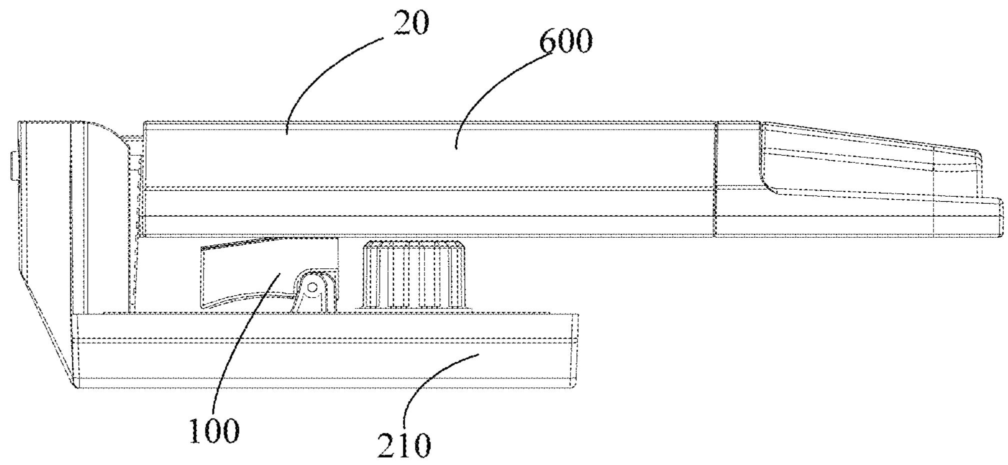
FIG. 7 is a schematic view of FIG. 6, viewed from another angle.
Figure 8:
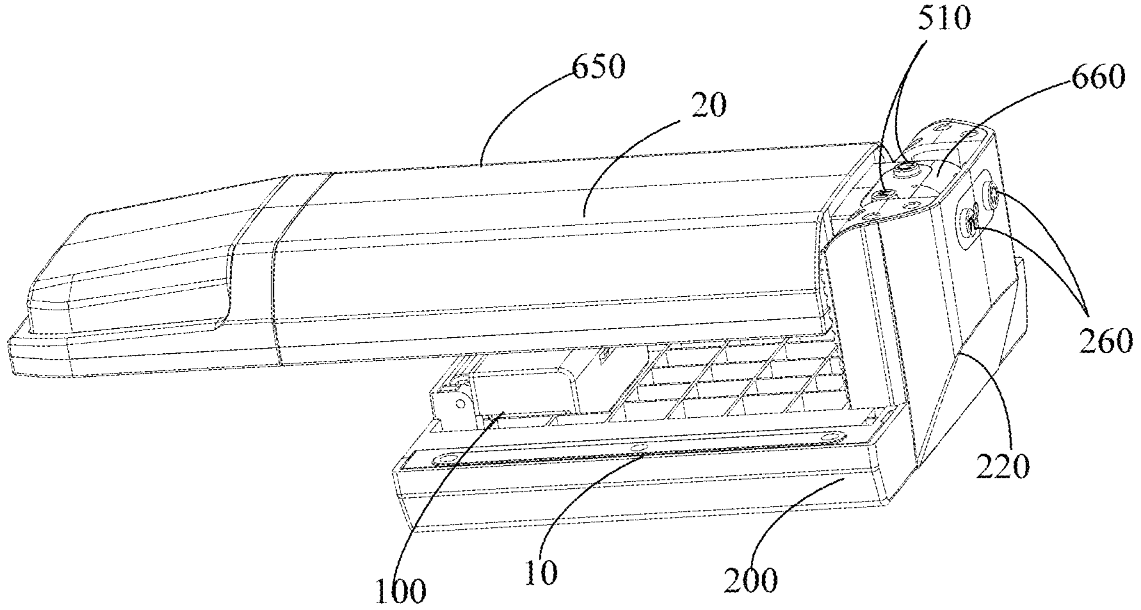
FIG. 8 is a schematic view of the solar-powered pool wall-mounted light in a folded state in accordance with another embodiment of the present disclosure.
Figure 9:
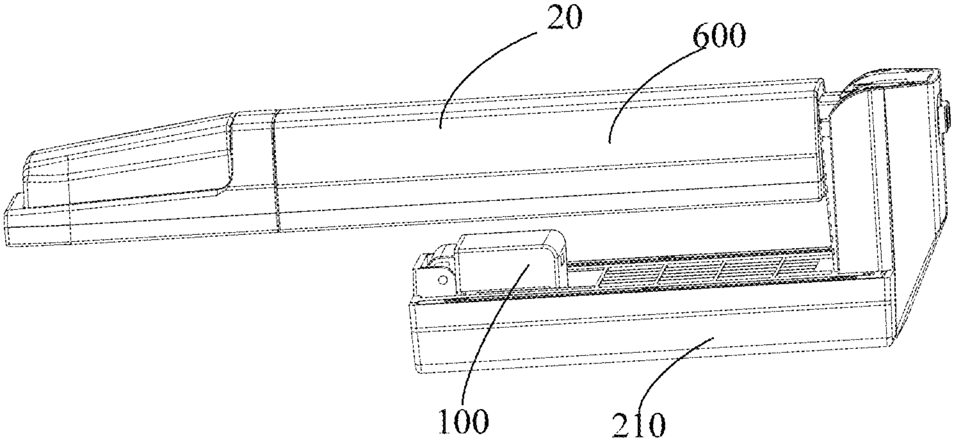
FIG. 9 is a schematic view of FIG. 8, viewed from another angle.
Figure 10:
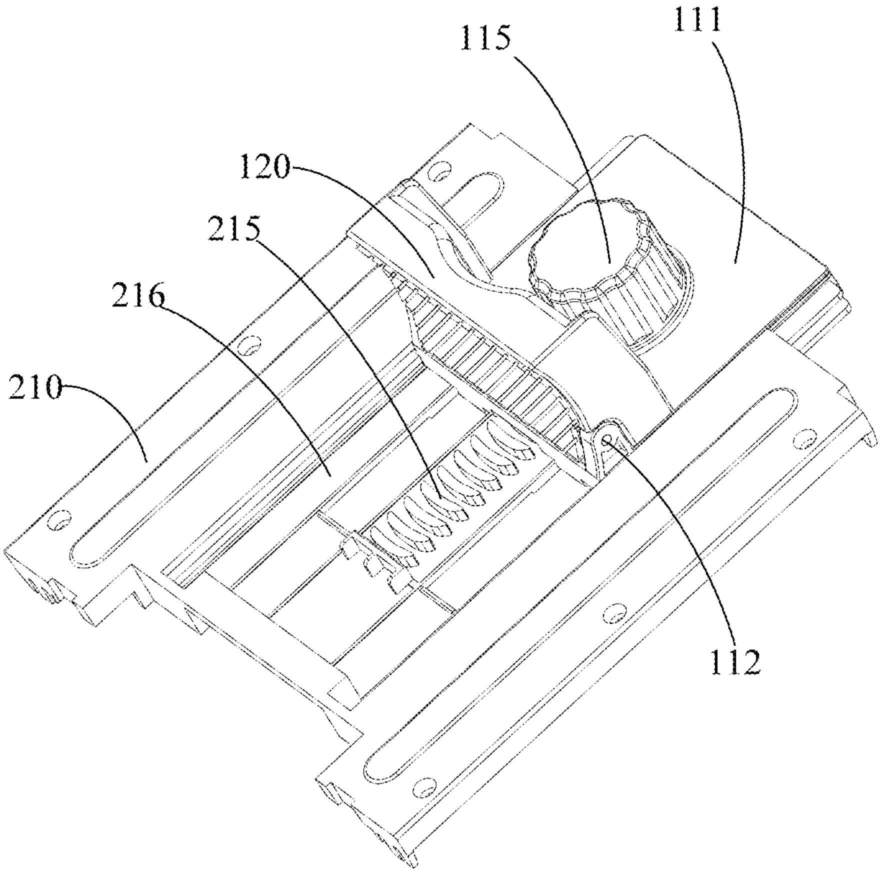
FIG. 10 is a schematic view showing the engagement between a clamping portion and a base plate assembly in accordance with an embodiment of the present disclosure.
Figure 11:
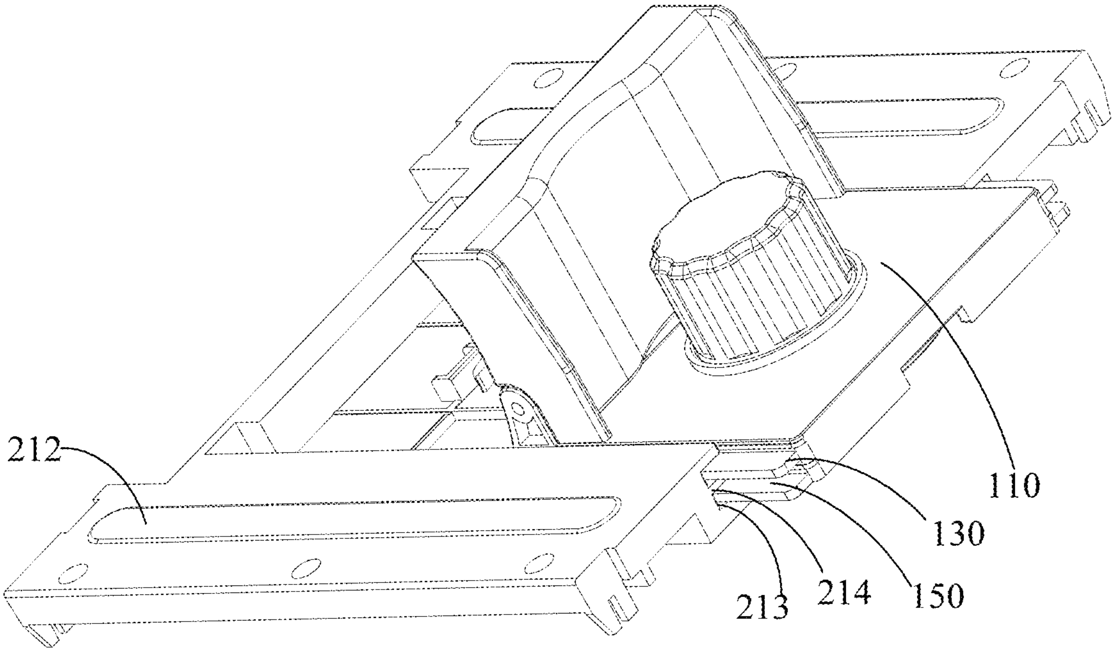
FIG. 11 is a schematic view of FIG. 10, viewed from another angle.
Figure 12:
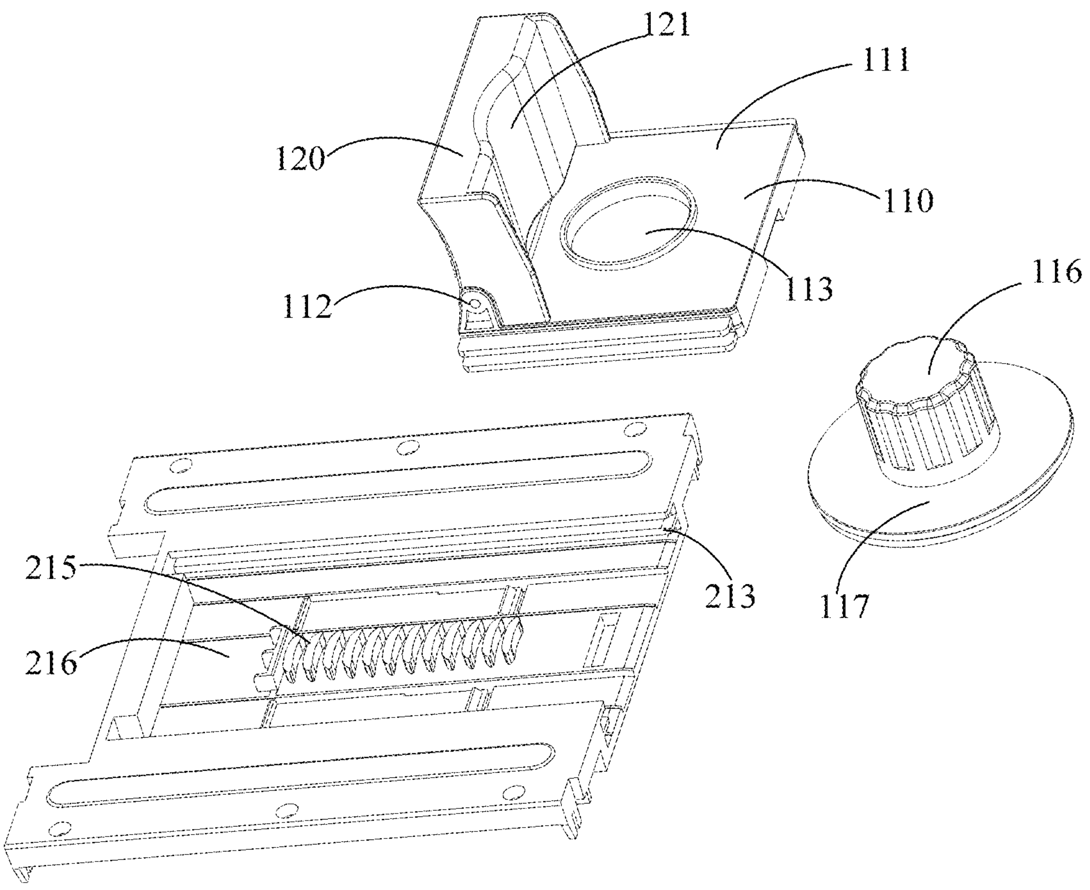
FIG. 12 is a schematic exploded view of FIG. 10.
Figure 13:
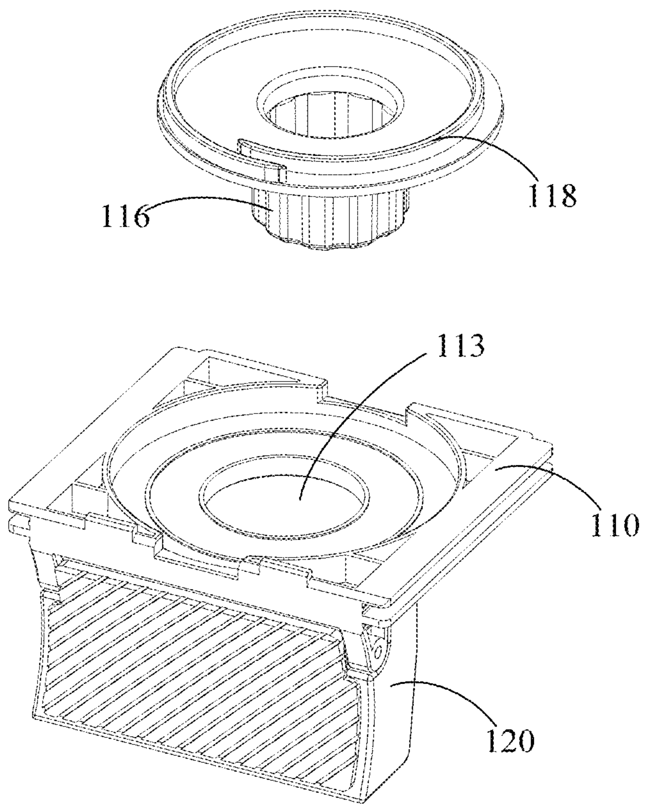
FIG. 13 is a schematic view of some components of FIG. 12, viewed from another angle.
Figure 14:
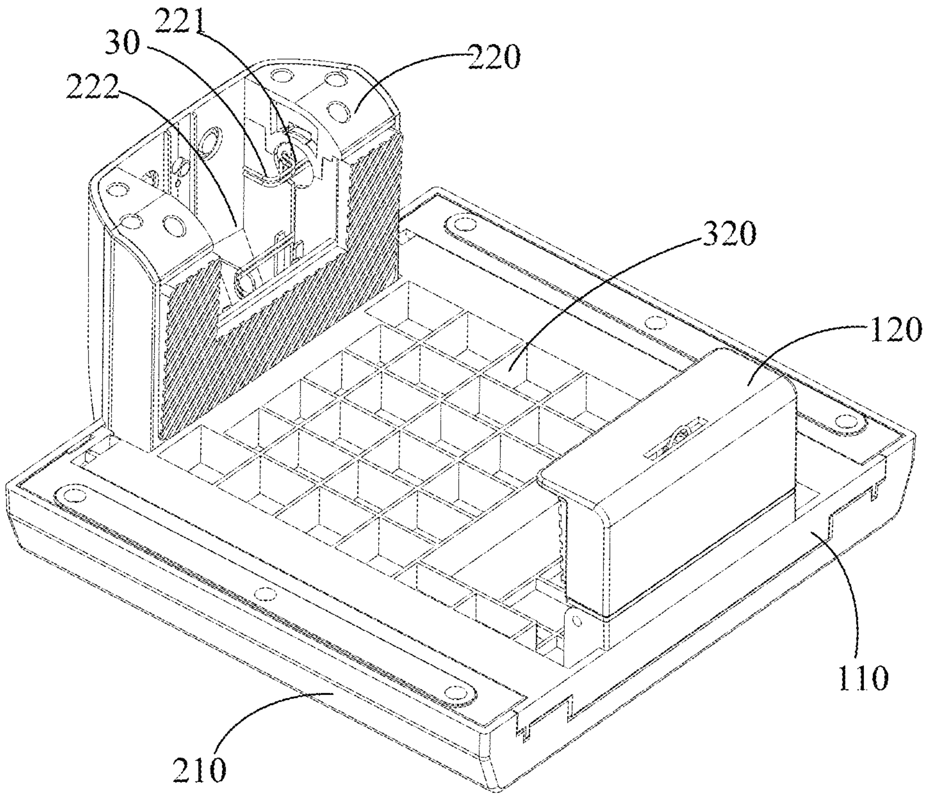
FIG. 14 is a schematic view showing the engagement between a clamping portion and a base plate assembly in accordance with another embodiment of the present disclosure.
Figure 15:
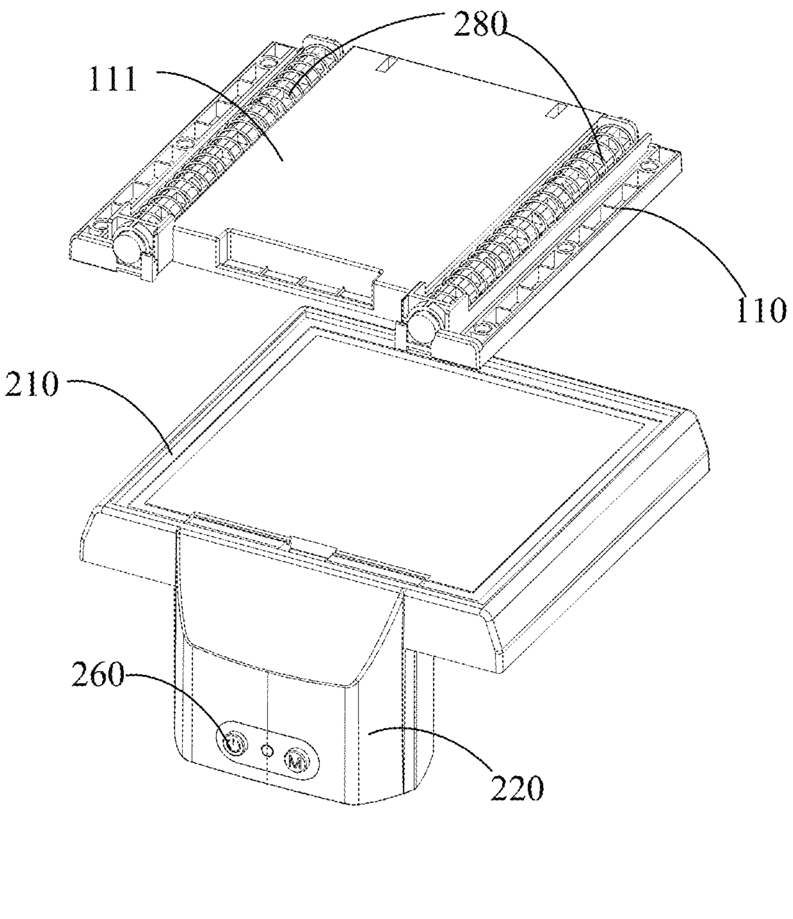
FIG. 15 is a schematic exploded view of FIG. 14.
Figure 16:
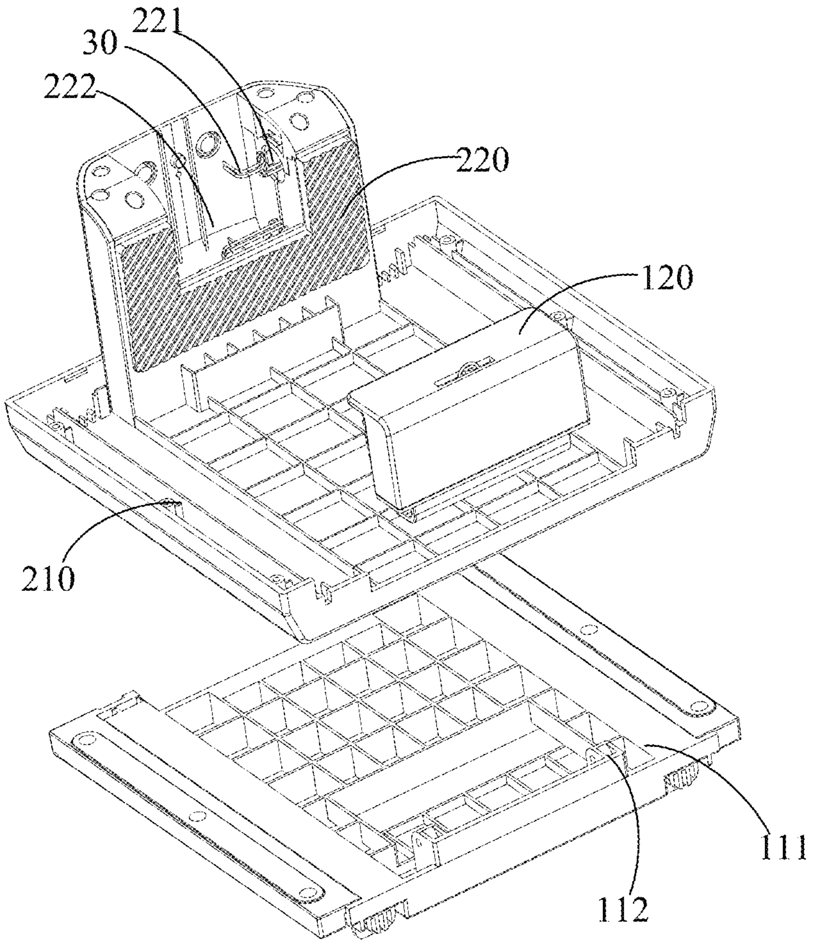
FIG. 16 is a schematic view of FIG. 15, viewed from another angle.
Figure 17:
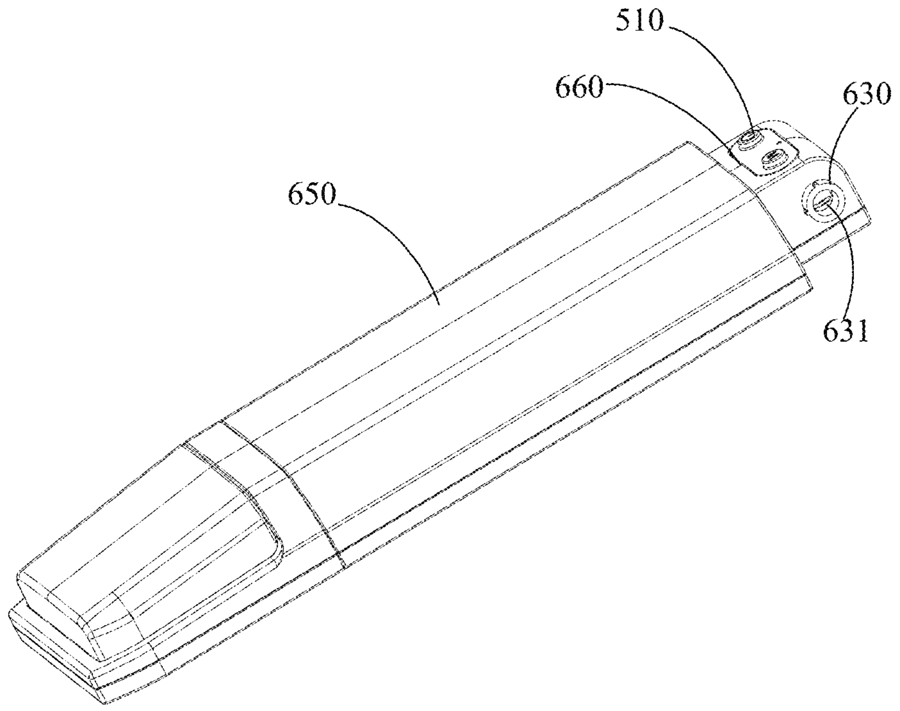
FIG. 17 is a schematic view of a lighting assembly in accordance with an embodiment of the present disclosure.
Figure 18:
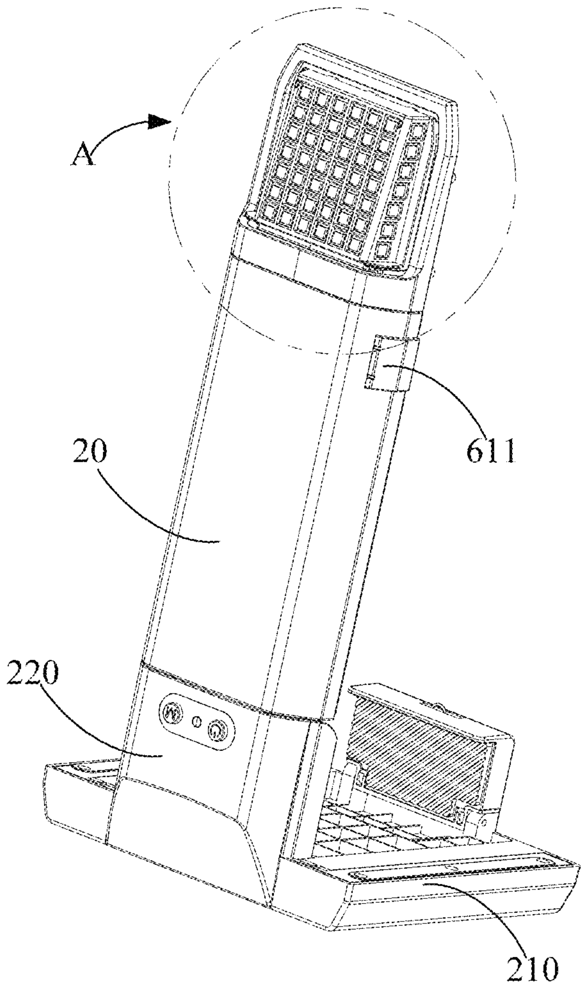
FIG. 18 is a schematic view showing that the lighting assembly is partially exposed.
Figure 19:
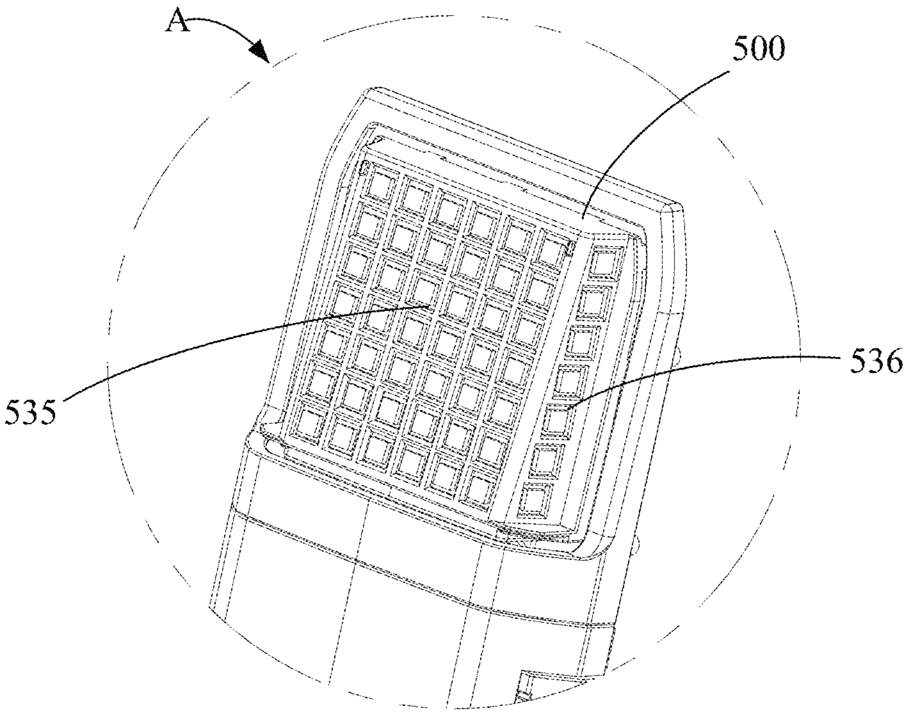
FIG. 19 is a partially enlarged schematic view of a section A in FIG. 18.
Figure 20:
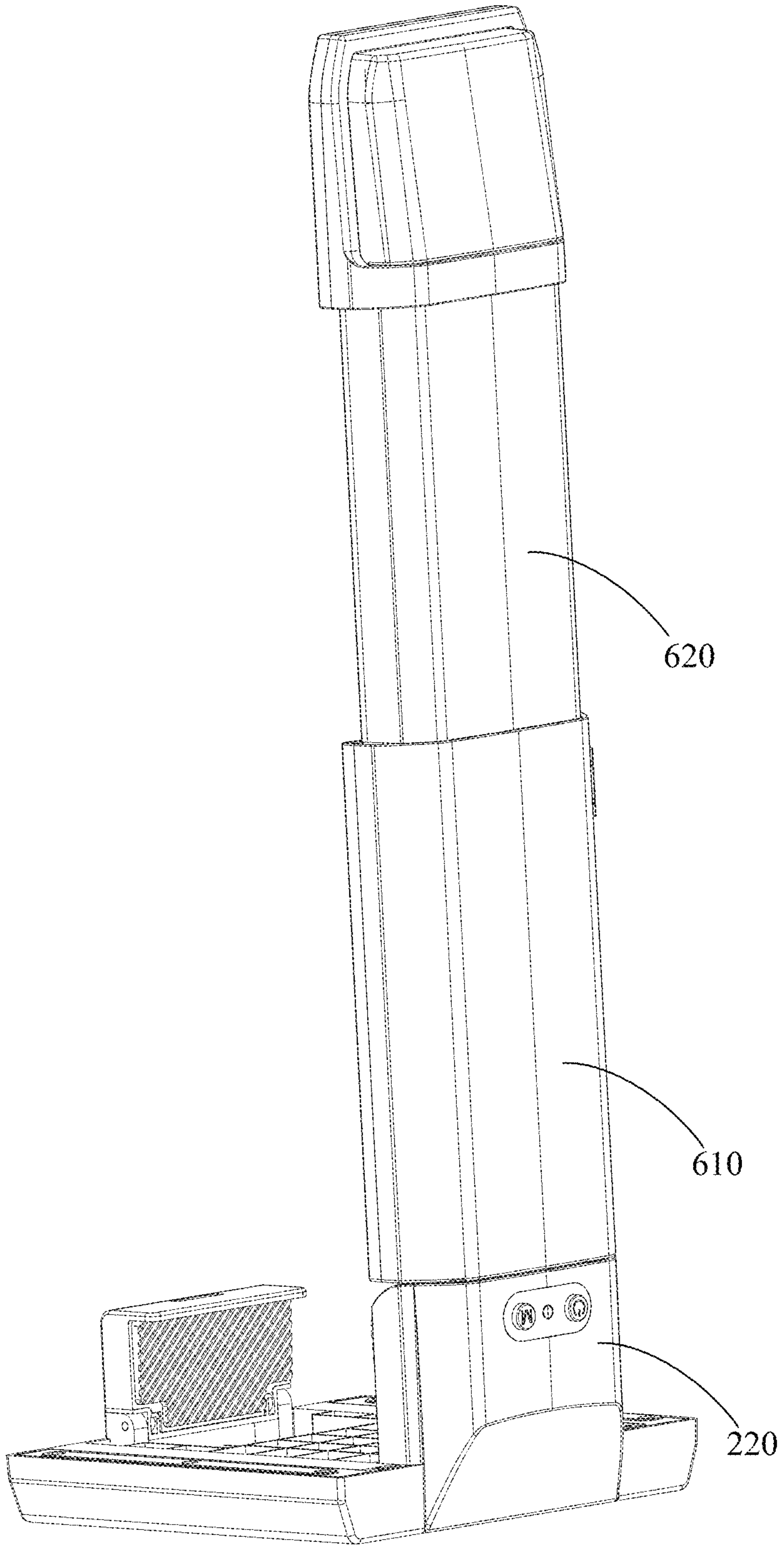
FIG. 20 is a schematic view showing that a second housing extends out of a first housing.
Figure 21:
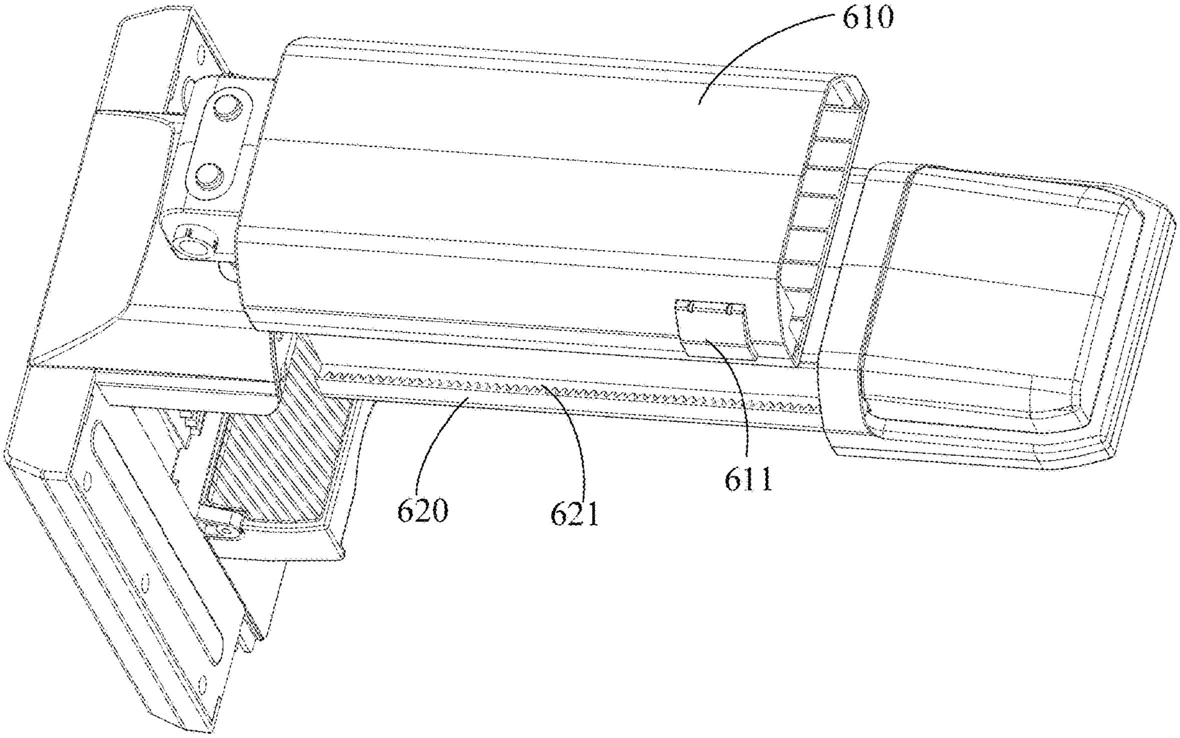
FIG. 21 is a schematic exploded view of the solar-powered pool wall-mounted light in accordance with an embodiment of the present disclosure.
Figure 22:
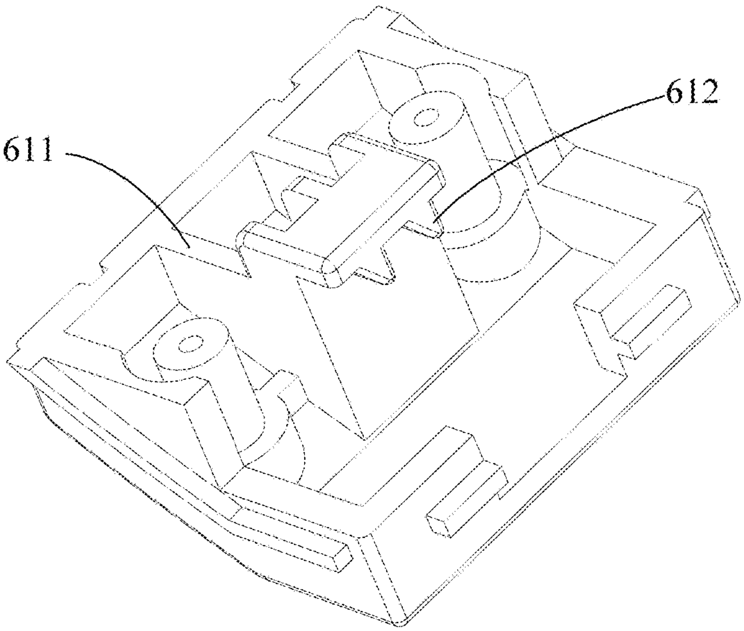
FIG. 22 is a schematic view of a clamping portion in accordance with an embodiment of the present disclosure.
Figure 23:
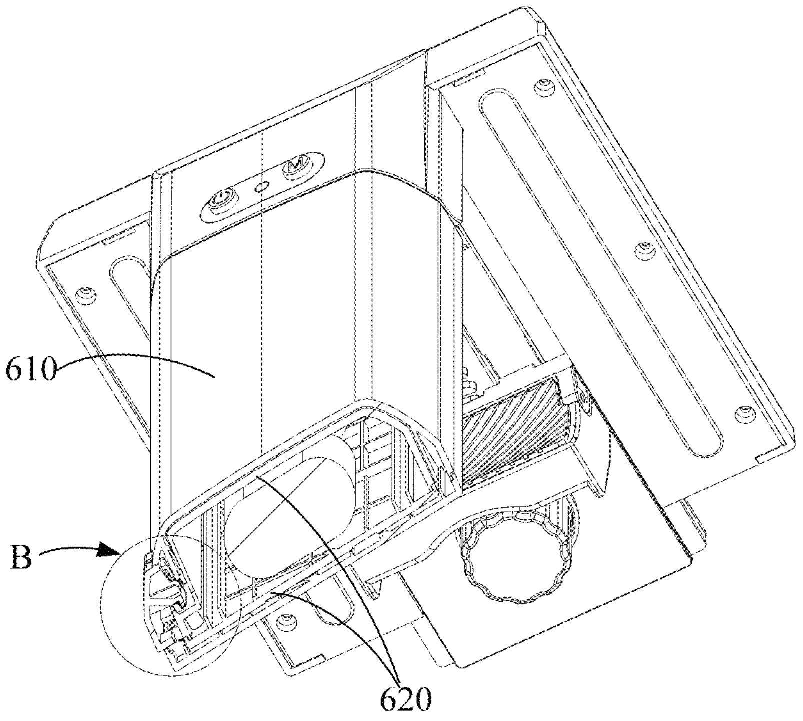
FIG. 23 is a schematic view showing an internal structure of the solar-powered pool wall-mounted light in accordance with an embodiment of the present disclosure.
Figure 24:
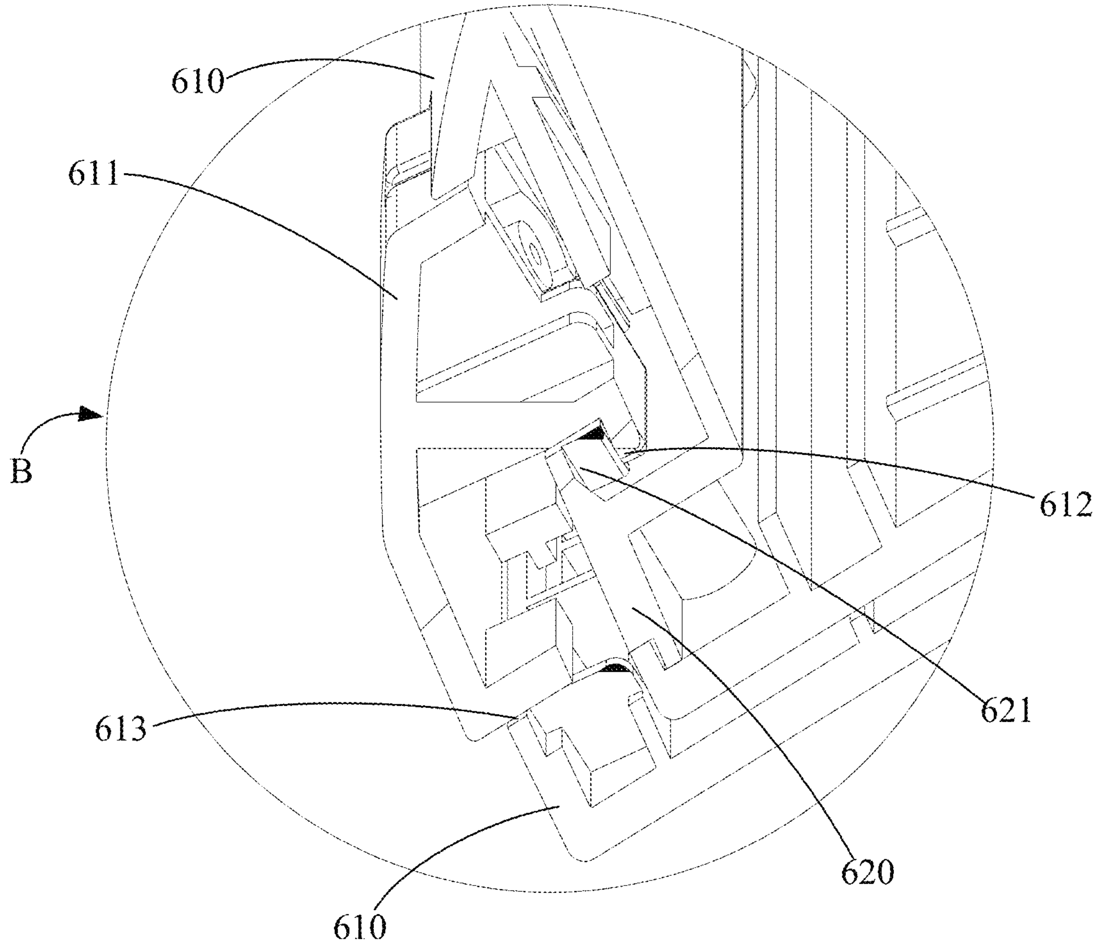
FIG. 24 is a partially enlarged schematic view of a section B in FIG. 23.

Referring to FIG. 4, as well as FIGS. 11 to 16, the fixed base 10 can be secured to the edge of the swimming pool in many ways, such as through fasteners like clamps and screws and through adhesive bonding.

When the fixed base 10 is clamped to the edge of the swimming pool, the fixed base 10 includes a clamping assembly 300. The clamping assembly 300 has a clamping space 320 and a clamping opening 310 communicating with the clamping space 320, which are configured to be clamped to the edge of the swimming pool. When the solar-powered pool wall-mounted light is in the expanded state, the clamping opening 310 is opened to allow the edge of the swimming pool to enter and exit the clamping space 320. When the solar-powered pool wall-mounted light is in the folded state, the housing 600 covers the clamping opening 310.

In this embodiment, the clamping assembly 300 can have many forms, provided that the clamping assembly 300 includes the clamping opening 310 and the clamping space 320 in any state, and includes a structure configured to be securely clamped to the edge of the swimming pool. When the solar-powered pool wall-mounted light is in the expanded state, the clamping opening 310 is opened, such that the clamping space 320 and the clamping opening 310 can be secured to the edge of the swimming pool. When the solar-powered pool wall-mounted light is in the folded state, the housing 600 covers the clamping opening 310, allowing the structure to be more compact and preventing debris from the external environment from entering the clamping space 320 through the clamping opening 310. This prevents perishable debris from spoiling and deteriorating inside the pool wall-mounted light, facilitating healthier use of the solar-powered pool wall-mounted light by people.

The clamping assembly 300 can have many forms, with two or three components being clamped to the edge of the swimming pool. For example, in some embodiments, the clamping assembly 300 can include a connecting portion 220 and a clamping portion 100 as illustrated in the following embodiments; in other embodiments, the clamping assembly 300 can include the connecting portion 220, the clamping portion 100, and a base plate assembly 210. The fixed base 10 includes a base seat 200 and the clamping portion 100. The base seat 200 includes the base plate assembly 210 and the connecting portion 220 arranged on the base plate assembly 210. The clamping portion 100 and the connecting portion 220 can move relative to each other to adjust a size of the clamping space 320 formed between the clamping portion 100 and the connecting portion 220. The clamping portion 100 and/or the connecting portion 220 are foldable relative to the base plate assembly 210.

In this embodiment, the connecting portion 220 and/or the clamping portion 100 can move relative to each other in three ways. In a first way, the connecting portion 220 is fixedly connected to the base plate assembly 210, while the clamping portion 100 is movably connected to the base plate assembly 210. The movement of the clamping portion 100 can adjust the size of the clamping space 320 formed between the clamping portion 100 and the connecting portion 220. In a second way, the clamping portion 100 is fixedly connected to the base plate assembly 210, while the connecting portion 220 is movably connected to the base plate assembly 210. The movement of the connecting portion 220 can adjust the size of the clamping space 320 formed between the connecting portion 220 and the clamping portion 100. In a third way, both the connecting portion 220 and the clamping portion 100 are movably connected to the base plate assembly 210. The movement of the connecting portion 220 and/or the clamping portion 100 can adjust the size of the clamping space 320.

The connecting portion 220 and/or the clamping portion 100 can be folded relative to the base plate assembly 210 in three ways. In a first way, the connecting portion 220 is rotatably connected to the base plate assembly 210, allowing the connecting portion 220 to be folded relative to the base plate assembly 210. The connecting portion 220 can fold towards the clamping portion 100 or away from the clamping portion 100. In a second way, the clamping portion 100 is rotatably connected to the base plate assembly 210, allowing the clamping portion 100 to be folded relative to the base plate assembly 210. The clamping portion 100 can fold towards the connecting portion 220 or away from the connecting portion 220. In a third way, both the clamping portion 100 and the connecting portion 220 are rotatably connected to the base plate assembly 210, such that both the clamping portion 100 and the connecting portion 220 can be folded relative to the base plate assembly 210. The clamping portion 100 and the connecting portion 220 can fold in the same direction or in opposite directions; for example, the clamping portion 100 and the connecting portion 220 can fold towards each other or away from each other. In this embodiment, by allowing the connecting portion 220 and/or the clamping portion 100 to be folded relative to the base plate assembly 210, a distance between the housing 600 and the base plate assembly 210 when the solar-powered pool wall-mounted light is in the folded state can be smaller (the housing 600 can be closer to the base plate assembly 210), thereby further reducing the volume of the solar-powered pool wall-mounted light in the folded state.

The following illustration is given based on that the connecting portion 220 is fixedly connected to the base plate assembly 210, while the clamping portion 100 is movably mounted on the base plate assembly 210. The housing 600 is pivotally connected to the connecting portion 220, and when the solar-powered pool wall-mounted light is in the folded state, the housing 600 folds towards the clamping portion 100.

In this embodiment, the housing 600 is configured to fold towards the clamping portion 100, such that the folded housing 600 is located above the clamping portion 100. This configuration allows the base plate assembly 210, the clamping portion 100, and the housing 600 to be stacked in a height direction when the solar-powered pool wall-mounted light is in the folded state, significantly reducing the volume after the housing 600 is folded and facilitating further improvement in the compactness and stability of the structure in the folded state.

Due to the varying distances between the position where the housing 600 is rotatably connected to the connecting portion 220 and the mounting surface 230, as well as the varying distances between a free end of the clamping portion 100 (one end of the clamping portion 100 is connected to the base plate assembly 210, and the other end extends towards the base plate assembly 210; the free end refers to the end of the clamping portion 100 that is away from the base plate assembly 210) and the mounting surface 230, the housing 600 is foldable to different extents, which may also affect the angle between the housing 600 and the mounting surface 230 when the solar-powered pool wall-mounted light is in the folded state. For simplicity, the distance between the position where the housing 600 is rotatably connected to the connecting portion 220 and the mounting surface 230 is defined as a first distance, and the distance between the free end of the clamping portion and the mounting surface 230 is defined as a second distance. Specific explanations are provided below.

In some embodiments, the distance between the position where the housing 600 is pivotally connected to connecting portion 220 and the mounting surface 230 is less than the distance between the free end of the clamping portion 100 and the mounting surface 230; the connecting portion 220 is foldable relative to the base plate assembly 210. When the solar-powered pool wall-mounted light is in the folded state, the connecting portion 220 folds to avoid the housing 600, and the housing 600 is folded outside the connecting portion 220.

In this embodiment, the first distance is less than the second distance, meaning that a height of the free end of the clamping portion 100 is greater than a height of the position where the housing 600 is pivotally connected to the connecting portion 220. When the housing 600 rotates and folds towards the clamping portion 100, the housing 600 abuts the free end before reaching a state being substantially parallel with the mounting surface 230 (assuming the clamping portion 100 is not folded). The clamping portion 100 is configured to be foldable, allowing the housing 600 to be closer to the base plate assembly 210. When the solar-powered pool wall-mounted light is in the folded state, the clamping portion 100 no longer hinders the rotation of the housing 600 towards the base plate assembly 210, thus enabling the housing 600 to achieve the state being substantially parallel with the mounting surface 230 after the housing 600 is folded. In this way, during the folding process, the clamping portion 100 folds towards the base plate assembly 210 first, and then the housing 600 folds towards the base plate assembly 210 to be located outside the clamping portion 100, achieving the final folded state.

In some embodiments, the distance between the position where the housing 600 is pivotally connected to the connecting portion 220 and the mounting surface 230 is greater than or equal to the distance between the free end of the clamping portion 100 and the mounting surface 230.

In this embodiment, the first distance is greater than or equal to the second distance, that is, the height of the free end of the clamping portion 100 is less than or equal to the height of the position where the housing 600 is pivotally connected to the connecting portion 220. When the housing 600 rotates and folds towards the clamping portion 100, the free end of the housing 600 does not hinder the movement of the housing 600 until the housing 600 reaches the state being substantially parallel with the mounting surface 230. In this way, the housing 600 can directly rotate and fold towards the clamping portion 100 without requiring previous folding of the clamping portion 100, which improves user convenience.

Referring to FIGS. 11 to 16, the clamping portion 100 can be movably connected to the base plate assembly 210 in many ways. Taking the sliding connection as an example, the connecting portion 220 is fixedly connected to the base plate assembly 210, and the housing 600 is pivotally connected to the connecting portion 220. When the solar-powered pool wall-mounted light is in the folded state, the housing 600 folds towards the clamping portion 100, and the clamping portion 100 folds towards the connecting portion 220.

The base plate assembly 210 is provided with a first sliding groove 213, and the clamping portion 100 is provided with a first sliding block 130. The first sliding block

130 slidably engages with the first sliding groove 213, and the clamping portion 100 is slidably connected to the base plate assembly 210.

Alternatively, the base plate assembly 210 is provided with a second sliding block 214, and the clamping portion 100 is provided with a second sliding groove 150. The second sliding block 214 slidably engages with the second sliding groove 150, and the clamping portion 100 is slidably connected to the base plate assembly 210.

Alternatively, the base plate assembly 210 is provided with the first sliding groove 213 and the second sliding block 214, while the clamping portion 100 is provided with the first sliding block 130 and the second sliding groove 150. The first sliding block 130 slidably engages with the first sliding groove 213, the second sliding block 214 slidably engages with the second sliding groove 150, and the clamping portion 100 slidably engages with the base plate assembly 210.

In this embodiment, the base plate assembly 210 includes a base plate 211 and the base plate assembly 210. There are two configurations of the base plate assembly 210: one is that the base plate 211 and the base plate assembly 210 are independent plates which can be assembled to form the base plate assembly 210; and another is that the base plate 211 and the base plate assembly 210 are integrally formed.

The clamping block 120 can slidably engage with the base plate assembly 210 in many ways, which is specifically explained below.

In some embodiments, the base plate assembly 210 is provided with two parallel first sliding grooves 213, and opposite sides of the clamping portion 100 are respectively provided with a sliding block 130. Each first sliding block 130 slidably engages with the corresponding first sliding groove 213, thereby achieving sliding engagement between the clamping block 120 and the base plate assembly 210.

In some embodiments, opposite sides of the clamping block 120 are respectively provided with a second sliding groove 150, and opposite sides of the base plate assembly 210 are respectively provided with a second sliding block 214. Each second sliding block 214 slidably engages with the corresponding second sliding groove 150, thereby achieving sliding engagement between the clamping block 120 and the base plate assembly 210.

In some embodiments, the clamping block 120 is provided with both the first sliding block 130 and the second sliding groove 150, and the base plate assembly 210 is provided with the first sliding groove 213 corresponding to the first sliding block 130 and the second sliding block 214 corresponding to the second sliding groove 150. The number of the first sliding block 130 corresponds to the number of the first sliding groove 213, which can be one, two, or even multiple, and is not specifically limited herein; the number of the second sliding groove 150 corresponds to the number of the second sliding block 214, which can also be one, two, or even multiple, and is also not specifically limited herein.

In the above embodiment, the clamping portion 100 can be folded relative to the base plate assembly 210 in many ways. For example, the entire clamping portion 100 can be folded relative to the base plate assembly 210, or a portion of the clamping portion 100 can be folded relative to the base plate assembly 210. Here is a specific example for illustration. The clamping portion 100 includes a sliding bracket 110 and the clamping block 120. The sliding bracket 110 is slidably connected to the base plate assembly 210, and the clamping block 120 is rotatably connected to the sliding bracket 110.

In this embodiment, the sliding bracket 110 is provided with a structure slidably engaging with the base plate assembly 210, such as the first sliding block 130 and the second sliding groove 150 in the above embodiment. The clamping block 120 can be rotatably connected to the sliding bracket 110 in many ways, such as through hinge connection or pivot connection. A portion of the sliding bracket 110 protrudes from the base plate assembly 210, and one end of the clamping block 120 is rotatably connected to the portion of the sliding bracket 110 that is away from the base plate assembly 210.

The base plate assembly 210 includes the base plate 211 and a guide plate 212 fixedly connected to the base plate 211. The sliding bracket 110 includes a sliding bottom plate 111 and a connecting lug 112 arranged on the sliding bottom plate 111. The clamping block 120 is rotatably connected to the connecting lug 112, and the sliding bottom plate 111 slidably engages with the guide plate 212. In some embodiments, the number of the connecting lug 112 can be two, and the two connecting lugs 112 are respectively arranged on opposite sides of the sliding bottom plate 111. When the clamping block 120 is expanded relative to the base plate assembly 210, the clamping block 120 is substantially perpendicular to the guide plate 212; when the clamping block 120 is folded relative to the guide plate 212, the clamping block 120 is substantially parallel with the guide plate 212.

In one embodiment, in order to facilitate the adjustment of the size of the clamping space 320 formed between the clamping portion 100 and the connecting portion 220, a structure for adjusting the position of the clamping portion 100 on the guide plate 212 is provided. For further details, please refer to the subsequent embodiment.

The sliding bottom plate 111 is provided with an exposure hole 113, and a plurality of positioning ribs 215 are arranged on a plate surface of the guide plate 212 facing the clamping portion 100 at intervals along a length direction of the plate surface.

The sliding bracket 110 further includes an adjustment knob 115, which includes a knob portion 116 and an adjustment portion 117. The knob portion 116 is exposed on the sliding bottom plate 111 through the exposure hole 113. The adjustment portion 117 is located on a side of the sliding bottom plate 111 facing the guide plate 212. The adjustment portion 117 includes a spiral rib 118 to engage with the positioning rib 215, such that the spiral rib 118 can switch to engage with different positioning ribs 215 when rotating along with the knob portion 116, thereby adjusting the position of the clamping portion 100 on the guide plate 212.

In this embodiment, a shape of each positioning rib 215 can be varied. Taking the positioning rib 215 being an arc-shaped strip as an example, a middle portion of the positioning rib 215 protrudes towards the connecting portion 220, and two ends of the positioning rib 215 extend away from the connecting portion 220. The multiple positioning ribs 215 are arranged in parallel at intervals on the plate surface of the guide plate 212, with a length direction of each positioning rib 215 being substantially the same as a width direction of the connecting portion 220.

The knob portion 116 extends from one side of the sliding bottom plate 111 to the other side of the sliding bottom plate 111 through the exposure hole, which allows users to control the rotation of the adjustment portion 117 by rotating the exposed knob portion 116, thereby causing the spiral rib 118 to rotate along with the knob portion 116. The spiral rib 118 is substantially spiral. The spiral rib 118 includes a head end and a tail end, and the head end is located outside the tail end (a radius of a circle where the head end is located is larger than that of the circle where the tail end is located). When the spiral rib 118 rotates clockwise (counterclockwise), the head end first enters a gap between the two adjacent positioning ribs; as the spiral rib 118 rotates, the head end sequentially passes through the gap, thereby causing the clamping block 120 to move towards the clamping portion 100, reducing the distance between the clamping block 120 and the connecting portion 220. When the spiral rib 118 rotates counterclockwise (clockwise), the head end enters the gap between the two adjacent positioning ribs, thereby causing the clamping block 120 to move away from the clamping portion 100, increasing the distance between the clamping block 120 and the connecting portion 220.

In some embodiments, to improve the compactness of the structure, the guide plate 212 is provided with a recessed portion 216. The positioning ribs 215 are located at a bottom of the recessed portion 216. The sliding bottom plate 111 is embedded in the recessed portion 216 and slidingly engages with a side wall of the recessed portion 216. After installation, the surface of the sliding bottom plate 111 is essentially flush with the surface of the guide plate 212. An avoidance groove 121 is formed in a side of the clamping block 120 facing the knob portion 116. An overall shape of the avoidance groove 121 is adapted to the knob portion 116; for example, the avoidance groove 121 may have an arc surface. This allows the avoidance groove 121 to provide a larger rotation space for the knob portion 116 and a larger rotation space for the clamping block 120, facilitating the full utilization of space and improving the compactness of the structure. The sliding bottom plate 111 and the bottom of the recessed portion 216 are enclosed to form an installation space in which the spiral rib 118 is arranged. The installation space ensures that the rotation of the spiral rib 118 is less susceptible to interference from external factors such as mosquitoes and sand, thereby improving the stability and reliability of the adjustment knob 115.

In other embodiments, the structure of the base plate assembly 210 may differ from that in the above embodiments. The base plate assembly 210 includes the base plate 211, and the sliding bracket 110 is slidably connected to the base plate 211. The sliding bracket 110 includes the sliding bottom plate 111 and the connecting lug 112 arranged on the sliding bottom plate 111. The clamping block 120 is rotatably connected to the connecting lug 112, and the sliding bottom plate 111 slidably engages with the base plate assembly 210.

The sliding bottom plate 111 and the base plate assembly 210 are enclosed to form an installation cavity. An elastic member 280 is arranged inside the installation cavity. When the clamping block 120 moves towards the connecting portion 220, an elastic potential energy of the elastic member 280 decreases. When the clamping block 120 moves away from the connecting portion 220, the elastic potential energy of the elastic member 280 increases.

In this embodiment, the functions of the sliding bracket 110 and the connecting lug are basically the same as those in the previous embodiments, with the difference lying in the specific structure of the sliding bracket 110. In this embodiment, when the sliding bottom plate 111 is in an initial position, one end of the sliding bottom plate 111 is essentially flush with the end surface of the base plate 211, and the other end of the sliding bottom plate 111 is adjacent to the connecting portion 220, maximizing a length of the installation cavity and thereby accommodating a larger volume of the elastic member 280. The elastic member 280 can have many forms, such as an elastic sheet or a spring; for example, the elastic member 280 can be a spring. When the clamping block 120 moves away from the connecting portion 220, the elastic member 280 is elastically deformed, and the elastic potential energy thereof increases; for example, the spring is stretched; when the clamping block 120 moves towards the connecting portion 220, the elastic member 280 returns to its original length under the elastic restoring force, and the elastic potential energy thereof decreases, for example, the spring returns to its original length.

In this embodiment, the distance between the clamping portion 100 and the connecting portion 220 is the closest initially. In use, the clamping portion 100 slides away from the connecting portion 220, such that the clamping space 320 formed between the clamping portion 100 and the connecting portion 220 is increased. During this process, the spring is stretched, and the elastic potential energy of the spring increases. When the clamping portion 100 and the connecting portion 220 engage with the edge of the swimming pool, the clamping portion 100 is clamped to the edge of the swimming pool under the elastic restoring force of the elastic member 280, thereby securing the fixed base 10.

In some embodiments, the fixed base 10 can also be secured to the edge of the swimming pool in the following manner. The fixed base 10 includes the base seat 200, the base seat 200 includes the base plate assembly 210 and the connecting portion 220 arranged on the base plate assembly 210, and the connecting portion 220 is rotatably connected to the housing 600, such that the lighting assembly 20 can be rotatably folded relative to the base seat 200. The base plate assembly 210 has a fixing surface 250. The fixing surface 250 and the mounting surface 230 are respectively located on opposite sides of the base plate assembly 210. The fixing surface 250 is configured to be conformally secured to the edge or a side wall of the swimming pool.

In this embodiment, the fixing surface 250 of the base plate assembly 210 is configured to conform to the edge of the swimming pool, such that the base plate assembly 210 engages with the edge of the swimming pool over a large area, thereby improving the installation stability of the fixed base 10. In some embodiments, the fixing surface 250 of the base plate assembly 210 can be secured to the edge of the swimming pool through adhesive bonding or other methods; in other embodiments, the base plate assembly 210 can be secured to the edge of the swimming pool using fasteners such as screws. Since the fixing surface 250 is opposite to the mounting surface 230, when the fixing surface 250 is secured downwards against the edge of the swimming pool, the mounting surface 230 faces upwards, allowing the solar panel 50 to face the sky and effectively absorb solar energy. In this way, the orientation of the solar panel 50 can be positioned by configuring the fixing surface 250, which improves the solar absorption efficiency of the solar panel 50.

In some embodiments, to improve the operational stability of the flexible electrical connector 30, one of the housing 600 and the fixed base 10 is provided with a rotation hole 221, while the other is provided with a rotation shaft 630. The rotation shaft 630 can be inserted into the rotation hole 221 to rotatably engage with the rotation hole 221. The rotation shaft 630 has a hollow structure to form a wiring hole 631 connecting the first channel 270 and the second channel 550 inside the rotation shaft 630, allowing the flexible electrical connector 30 to extend from one of the first channel 270 and the second channel 550 to the other.

In some embodiments, the rotation shaft 630 can be located on the housing 600, the rotation hole 221 is located on the fixed base 10; in other embodiments, the rotation shaft 630 can be located on the fixed base 10, while the rotation hole 221 can be located on the housing 600. In this embodiment, the example is given where the rotation shaft 630 is located on the housing 600 and the rotation hole 221 is located on the fixed base 10. The number of the rotation shaft 630 is two, and the two rotation shafts 630 are respectively arranged on both sides of the housing 600 along the width direction of the housing 600. At least one of the two rotation shafts 630 has a wire-passing hole. It can be understood that the number and position of the rotation hole 221 respectively correspond to those of the rotation shaft 630.

The wiring hole 631 runs through the rotation shaft 630 along a length direction of the rotation shaft 630, such that both ends of the wiring hole 631 are respectively connected to the first channel 270 and the second channel 550, allowing the flexible electrical connector 30 to enter the second channel 550 from the first channel 270 in a concealed manner. In this embodiment, by arranging the rotation shaft 630 to be inserted into the rotation hole 221 and providing the wiring hole 631 inside the rotation shaft 630, the flexible electrical connector 30 is fully received within the housing 600 and the fixed base 10. Whether in the folded or expanded state, the flexible electrical connector 30 remains concealed (hidden within the solar-powered pool wall-mounted light), thereby protecting the flexible electrical connector 30 from external environmental factors such as water, dust, mosquitoes, and accidental collisions with objects. Such configuration significantly improves the operational stability and reliability of the flexible electrical connector 30, ultimately improving the electrical connection reliability between the solar panel 50 and the lighting lamp set 500.

In some embodiments, to improve the compactness of the structure, the fixed base 10 includes the base seat 200. The base seat 200 includes the base plate assembly 210 and the connecting portion 220 arranged on the base plate assembly 210. The connecting portion 220 has an insertion slot 222. The housing 600 includes an insertion portion 660 inserted into the insertion slot 222. One of the rotation hole 221 and the rotation shaft 630 is located on the insertion portion 660, while the other is located on an inner side wall of the insertion slot 222.

In this embodiment, the base plate assembly 210 is substantially shaped as a plate. An angle being approximately 90° is formed between the connecting portion 220 and the base plate assembly 210, meaning that the connecting portion 220 is substantially perpendicular to the base plate assembly 210. The insertion slot 222 is located at an end of the connecting portion 220 away from the base plate assembly 210, and the insertion slot 222 is substantially located in the middle portion of the connecting portion 220 in the width direction of the connecting portion 220. The housing 600 includes a housing body 650 and the insertion portion 660. The insertion portion 660 is located at one end of the housing body 650. In some embodiments, a width of the insertion portion 660 can be equal to that of the housing body 650; while in other embodiments, the width of the insertion portion 660 is less than the width of the housing body 650, and the width of the housing body 650 is substantially equal to the width of the connecting portion 220. During assembly, the insertion portion 660 is first inserted into the insertion slot 222, and the rotation shafts 630 on both sides of the insertion portion 660 are inserted into the rotation holes 221 defined in the side wall of the insertion slot 222, respectively. In this embodiment, the engagement between the insertion portion 660 and the insertion slot 222 causes a partial overlap between the housing 600 and the connecting portion 220, achieving a higher degree of conformity between the housing 600 and the connecting portion 220, which improves the compactness of the structure. Meanwhile, the flexible electrical connector is inserted into the overlapping area, fully utilizing the space.

In the above embodiment, the first channel 270 can have various forms, which are exemplified below.

In some embodiments, the first channel 270 includes a first vertical portion and a first horizontal portion. The first vertical portion extends from the solar panel 50 to one end of the wiring hole 631, and the first horizontal portion is either the rotation hole 221 or the wiring hole 631. In this embodiment, the connection position between the solar panel 50 and the flexible electrical connector is located on one side of the solar panel 50 and is away from the middle of the solar panel 50, and the connection position corresponds to the side wall of the insertion slot 222. At this time, one end of the flexible electrical connector 30 is connected to the solar panel 50, the first vertical portion extends vertically into the side wall of the insertion slot 222, and the first horizontal portion extends horizontally from the end of the first vertical portion to one end of the wiring hole 631. In this way, the extension path of the flexible electrical connector 30 can be simplified.

In some embodiments, the first channel 270 includes a second vertical portion, a second horizontal portion, a third vertical portion, and a fourth horizontal portion, which are connected sequentially. The second vertical portion extends from the solar panel 50 to the insertion slot 222. The second horizontal portion extends from the insertion slot 222 into the side wall of the insertion slot 222. The third vertical portion extends from the second horizontal portion to one end of the wiring hole 631. The fourth horizontal portion is either the rotation hole 221 or the wiring hole 631. In this embodiment, the connection position between the solar panel 50 and the flexible electrical connector is located in the middle of the solar panel 50, corresponding to the insertion slot 222. At this time, one end of the flexible electrical connector 30 is connected to the middle of the solar panel 50, the second vertical portion extends vertically to a position adjacent to the insertion slot 222, the second horizontal portion extends from a tail end of the second vertical portion into the side wall of the insertion slot 222, the third vertical portion extends vertically from a tail end of the second horizontal portion to a position corresponding to the wiring hole 631 in the side wall of the insertion slot 222, and the fourth horizontal portion extends horizontally from a tail end of the third vertical portion to the wiring hole 631. In this embodiment, the flexible electrical connector 30 and the solar panel 50 can be connected at the middle of the solar panel 50, and the existing solar panel 50 can be directly utilized without any adjustment.

In some embodiments, to control the illumination of the light source, the lighting lamp set 500 includes the control switch 510, the button board 520, and a light panel assembly 530. The button board 520 is electrically connected to the control switch 510 and the light panel assembly 530, and the control switch 510 controls the light panel assembly 530 through the button board 520. The control switch 510 is mounted on one end of the housing 600 close to the fixed base 10, and is exposed on the housing 600. The button board 520 is located inside the housing 600 and is arranged corresponding to the control switch 510. The button board 520 is electrically connected to the light panel assembly 530 through a flexible electrical connection structure 537.

In this embodiment, the end of the flexible electrical connector 30 away from the solar panel 50 is electrically connected to the button board 520, which is then electrically connected to the light panel assembly 530 through the flexible electrical connection structure 537. The flexible electrical connection structure 537 can be a wire, a flexible circuit board, or the like.

The number and type of the control switch 510 may be varied. For example, the control switch 510 may include a power switch for controlling an on/off state of the lamp beads and a mode button for controlling the lighting mode, which is not specifically limited herein and can be configured and selected according to actual needs. After the solar-powered pool wall-mounted light is secured to the edge of the swimming pool, since the control switch 510 is arranged at the end of the housing 600 adjacent to the fixed base 10, the control switch 510 is correspondingly located adjacent to the edge of the swimming pool. Such configuration offers two main advantages: on one hand, such configuration facilitates user operation and improves convenience; on the other hand, such configuration ensures that the control switch 510 remains exposed above the water surface of the swimming pool, preventing the control switch 510 from being submerged. This helps reduce the risk of electrical issues and enhances the operational stability of the solar-powered pool wall-mounted light.

It is noted that in some embodiments, the control switch 510 and the button board 520 can also be mounted on the fixed base 10. In this case, the flexible electrical connector 30 connects the solar panel 50 and the button board 520, one end of the flexible electrical connection structure 537 is electrically connected to the button board 520, and the other end of the flexible electrical connection structure 537 extends from the fixed base 10 into the housing 600 to be electrically connected to the light panel assembly 530.

In some embodiments, to improve the compactness of the structure and facilitate the control of the solar-powered pool wall-mounted light, the fixed base 10 includes the base seat 200. The base seat 200 includes the base plate assembly 210 and the connecting portion 220 arranged on the base plate assembly 210. The connecting portion 220 has the insertion slot 222, and the housing 600 includes the insertion portion 660 inserted into the insertion slot 222. When the solar-powered pool wall-mounted light is in the expanded state, the control switch is located within the insertion slot 222, and an auxiliary button 260 is arranged on the side wall of the insertion slot 222 corresponding to the control switch. The auxiliary button 260 is used to control the light panel assembly 530 by pressing the control switch. When the solar-powered pool wall-mounted light is in the folded state, the control switch is exposed on the insertion slot 222.

In this embodiment, the structure of the connecting portion 220, the insertion portion 660, and the like can refer to the above embodiments, and will not be repeated herein. The difference from the above embodiments lies in that the auxiliary button 260 is arranged on the connecting portion 220 corresponding to the control switch, thus, the auxiliary button 260 can correspond to the control switch when the solar-powered pool wall-mounted light is in the expanded state. When the control switch is hidden, the pressing force from the user can be transmitted to the control switch through the auxiliary button 260. The control switch is located on the insertion portion 660. In the expanded state, the insertion portion 660 is located in the insertion slot 222, and the control button is hidden by the side wall of the insertion slot 222, users cannot press the control switch directly. The auxiliary button 260 is mounted on the corresponding side wall and may not be electrically connected to any component. When it is necessary to press the control button, the user can press the auxiliary button 260 corresponding to the control switch, and the auxiliary button 260 transmits the pressing force to the control switch, thereby enabling users to control the light panel assembly 530. In this way, with the auxiliary button 260 arranged on the connecting portion 220, when the solar-powered pool wall-mounted light is secured to the edge of the swimming pool (in the expanded state), users can directly control the working state of the solar-powered pool wall-mounted light through the auxiliary button 260 without disassembling the solar-powered pool wall-mounted light or switching the form of the solar-powered pool wall-mounted light, greatly improving user convenience. At the same time, the control switch is also hidden in the insertion slot 222, and is shielded by the side wall of the insertion slot 222, preventing water, mosquitoes, and other factors in the surrounding environment from affecting the operation of the control button.

In some embodiments, to further improve the lighting effect, the light panel assembly 530 includes an electronic control board 532 and a light board 531 electrically connected to the electronic control board 532. The light board 531 is shaped as a boss, and includes a main lighting surface 535 and at least one side lighting surface 536 which is arranged obliquely relative to the main lighting surface 535.

In this embodiment, the housing 600 corresponding to the position of the light board 531 is made of light-transmitting material, allowing the light emitted by the LED beads on the light board 531 to pass through and exit from the housing 600 at the corresponding position. The form of the boss-like light board may be varied. Taking a trapezoidal boss as an example, a cross-section of the boss is trapezoidal. In this embodiment, the main lighting surface 535 directly faces the swimming pool, and the side lighting surfaces 536 are respectively located on left and right sides of the main lighting surface 535. By arranging the side lighting surface 536 to be inclined relative to the main lighting surface 535, the light emission directions of the main lighting surface 535 and the side lighting surface 536 are different from each other. Thus, the light board 531 can emit a wide range of light in different directions, thereby producing board three-dimensional illumination. Such configuration greatly improves the radiation range and lighting effect of the light panel assembly 530. When the light emitted by the side lighting surfaces 536 of two adjacent solar-powered pool wall-mounted lights irradiates the same area, the lighting effect in that area is enhanced.

Referring further to FIGS. 17 to 20, in some embodiments, to improve the adaptability of the solar-powered pool wall-mounted light, the housing 600 is configured to be adjustable in length, or in other words, the distance between the lighting lamp set 500 and the fixed base 10 is adjustable. As a result, a depth at which the lighting lamp set 500 extends into the swimming pool is adjustable, allowing the solar-powered pool wall-mounted light to be suitable for a wider range of pool conditions.

The housing 600 includes a first housing 610 and a second housing 620. The first housing 610 is rotatably connected to the fixed base 10, while the second housing 620 is movably connected to the first housing 610, allowing the second housing 620 to extend and retract along a length direction of the first housing 610.

The lighting lamp set 500 is arranged inside the second housing 620, such that the lighting lamp set 500 can move as the second housing 620 extends or retracts, and thus the depth at which the lighting lamp set 500 extends into the swimming pool can be adjusted.

Alternatively, the lighting lamp set 500 includes the control switch 510, the button board 520, and the light panel assembly 530. The button board 520 is electrically connected to the control switch 510 and the light panel assembly 530, allowing the control switch 510 to control the light panel assembly 530 through the button board 520. The control switch 510 and the button board 520 are mounted on the first housing 610, while the light panel assembly 530 is mounted on the second housing 620. Such configuration allows the light panel assembly 530 to move as the second housing 620 extends or retracts, thereby adjusting the depth at which the light panel assembly 530 extends into the swimming pool.

In this embodiment, the first housing 610 can have many forms, such as a housing with a receiving space or a bracket providing a moving path. The specific form is not limited herein, provided that the first housing 610 can provide support for the installation and movement of the second housing 620. The second housing 620 is movably connected to the first housing 610 and can move along the length direction of the first housing 610, thus, the light panel assembly 530 or the lighting lamp set 500 can move along the length direction of the first housing 610, thereby adjusting the depth at which the light panel assembly 530 or the lighting lamp set 500 extends into the swimming pool. The second housing 620 can be a single housing or formed by multiple housing parts.

The position of the second housing 620 relative to the first housing 610 can be adjusted in various ways. In some embodiments, the adjustment may be stepless, meaning that the connection position between the second housing 620 and the first housing 610 is continuous. For example, the adjustment can be achieved by a guide slot and a locking member. That is, the second housing 620 can slide along the guide slot, and when moving to a desired position, the second housing can be locked to the first housing 610 by the locking member. In other embodiments, the adjustment may be stepped, meaning that the number of possible engagement positions between the second housing 620 and the first housing 610 is limited. For example, several engagement positions may be provided on the first housing 610, and the second housing 620 can fixedly engage with any one of these engagement positions.

Regarding the positional relationship between the first housing 610 and the second housing 620, in some embodiments, at least a portion of the first housing 610 can be sleeved on the second housing 620; in other embodiments, at least a portion of the second housing 620 can be sleeved on the first housing 610. It is noted that in yet other embodiments, the positional relationship between the first housing 610 and the second housing 620 may also have other possibilities, which is not specifically limited herein. The only requirement is that the second housing 620 can move relative to the first housing 610 to adjust the distance between the second housing 620 and the fixed base 10 (mounting surface).

It is noted that since the lighting lamp set 500 includes multiple components, in practical arrangements, these components can be arranged separately in the first housing 610 and the second housing 620. These components can be arranged in many ways, which is not specifically limited herein. The only requirement is that the light board 531 is fixedly mounted in the second housing 620, as adjusting the lighting depth only requires the position of the light board 531 to be movable.

Regarding the distribution of various parts of the lighting lamp set 500, some examples are given below for specific illustration. In some embodiments, the entire lighting lamp set 500 can be arranged inside the second housing 620, and the entire lighting lamp set 500 moves along with the second housing 620. The lighting lamp set 500 includes at least one light board 531.

In some embodiments, taking the lighting lamp set 500 including the control switch 510, the button board 520, and the light panel assembly 530 as an example, for ease of operation, the control switch 510 and the button board 520 can be mounted on the first housing 610, while the light panel assembly 530 (including the light board 531) can be mounted on the second housing 620.

Referring to FIGS. 20 to 24, a specific example is given below to illustrate how the second housing 620 moves relative to the first housing 610.

A plurality of first meshing teeth 621 is arranged on one of a side wall of the first housing 610 and a side wall of the second housing 620, and a clamping portion 611 is arranged on the other of the side wall of the first housing 610 and the side wall of the second housing 620. The first meshing teeth 621 are arranged along the length direction of the first housing 610. The clamping portion 611 includes a second meshing tooth 612. The first meshing teeth 621 and the second meshing tooth 612 can mesh with each other. The second meshing tooth 612 is configured for meshing with the corresponding first meshing tooth 621. The clamping portion 611 is configured to engage with the first meshing teeth 621 to fix the positional relationship between the first housing 610 and the second housing 620.

The clamping portion 611 movably engages with the first housing 610 or the second housing 620, allowing the clamping portion 611 to have a locked position and an unlocked position. When the clamping portion 611 is in the unlocked position, the first meshing teeth 621 disengage from the second meshing tooth 612, allowing the first housing 610 and the second housing 620 to move relative to each other. When the clamping portion 611 is in the locked position, the first meshing teeth 621 engage with the second meshing tooth 612, locking the first housing 610 and the second housing 620 together, preventing the first housing 610 and the second housing 620 from moving relative to each other.

The clamping portion 611 can movably engage with the first housing 610 or the second housing 620 in many ways. In the following, an example is provided where the clamping portion 611 is arranged on the first housing 610 for description. An installation opening 613 is formed in the side wall of the first housing, running through the side wall. The clamping portion 611 is movably mounted in the installation opening 613 and is at least partially exposed on the first housing 610. After the clamping portion 611 is mounted in the installation opening 613, the second meshing tooth 612 is located inside the first housing 610 and can correspond to the first meshing teeth 621 on the second housing 620.

The clamping portion 611 can be slidingly or rotatably mounted in the installation opening 613, allowing the second meshing tooth 612 to move closer to or farther away from the first meshing teeth 621. When the clamping portion 611 slides or rotates to cause the second meshing tooth 612 to disengage from the first meshing teeth 621, the clamping portion 611 is in the unlocked position; when the clamping portion 611 slides or rotates to cause the second meshing tooth 612 to engage with the first meshing teeth 621, the clamping portion 611 is in the locked position.

During use, when it is necessary to adjust the depth at which the light source (the lighting lamp set 500 or the light panel assembly 530) extends into the swimming pool, the clamping portion 611 is set in the unlocked position, and the second housing 620 is moved. When the second housing 620 reaches the desired position, the clamping portion 611 is switched to the locked position to lock the second housing 620 and the first housing 610, thereby locking the second housing 620 in a preset position.

In this embodiment, by arranging the first engaging teeth 621 on one of the side wall of the first housing 610 and the side wall of the second housing 620, and providing the clamping portion 611 on the other of the side wall of the first housing 610 and the side wall of the second housing 620, and configuring the clamping portion 611 to have the locked position and the unlocked position, the first housing 610 and the second housing 620 can be in a locked state (with the clamping portion 611 being in the locked position) and an unlocked state (with the clamping portion 611 being in the unlocked position). In the unlocked state, the first housing 610 and the second housing 620 can move relative to each other, thereby adjusting the depth at which the second housing 620 extends into the swimming pool; in the locked state, the second housing 620 is locked to the first housing 610 by the clamping portion 611, such that the depth at which the second housing 620 can extend into the swimming pool is fixed. In this way, the relative position of the second housing 620 and the first housing 610 can be easily adjusted, thereby adjusting the depth at which the second housing 620 extends into the swimming pool, greatly improving user convenience.

The present disclosure further provides a solar-powered pool wall-mounted light, which includes the fixed base 10, the solar panel 50, the lighting assembly 20, and the flexible electrical connector.

The fixed base 10 is configured to be secured to the edge of the swimming pool. The fixed base 10 has the mounting surface 230 and the first channel 270, and the first channel 270 extends from the interior of the fixed base 10 to the mounting surface 230.

The solar panel 50 is mounted on the mounting surface 230. When the solar-powered pool wall-mounted light is in operation, the solar panel 50 is exposed outside the swimming pool, and the panel surface of the solar panel 50 faces away from the swimming pool.

The lighting assembly 20 includes the housing 600 and the lighting lamp set 500 arranged inside the housing 600. The lighting lamp set 500 is configured to extend into the swimming pool to provide illumination. The housing 600 has the second channel 550, which connects the lighting lamp set 500 to the exterior of the housing 600.

One end of the flexible electrical connector is connected to the solar panel 50 through the first channel 270, and the other end of the electrical connector is electrically connected to the lighting lamp set 500 through the second channel 550.

The housing 600 includes the first housing 610 and the second housing 620. The first housing 610 is connected to the fixed base 10, while the second housing 620 is movably connected to the first housing 610, allowing the second housing 620 to move along the length direction of the first housing 610.

The lighting lamp set 500 is arranged inside the second housing 620 and is capable of moving as the second housing 620 extends or retracts, such that the depth at which the lighting lamp set 500 extends into the swimming pool can be adjusted.

Alternatively, the lighting lamp set 500 includes the control switch 510, the button board 520, and the light panel assembly 530. The button board 520 is electrically connected to the control switch 510 and the light panel assembly 530, allowing the control switch 510 to control the light panel assembly 530 through the button board 520. The control switch 510 and the button board 520 are mounted on the first housing 610, while the light panel assembly 530 is mounted on the second housing 620. Such configuration allows the light panel assembly 530 to move as the second housing 620 extends or retracts, thereby adjusting the depth at which the light panel assembly 530 extends into the swimming pool.

In this embodiment, the specific structures of the fixed base 10, the solar panel 50, and the lighting assembly 20 can be referred to the above embodiments, which is not repeated herein. The difference between this embodiment and the above embodiments lies in that the engagement between the fixed base 10 and the lighting assembly 20 does not restrict the relative rotation between the fixed base 10 and the lighting assembly 20, meaning that the fixed base 10 and the lighting assembly 20 can be non-foldable in this embodiment. It is noted that in this embodiment, the fixed base 10 and the lighting assembly 20 can also be foldable. When the fixed base 10 and the lighting assembly 20 are fixedly connected and non-foldable, the solar panel 50 and the lighting lamp set 500 can be connected through a rigid electrical connector.

In this embodiment, the engagement between the first housing 610 and the second housing 620 can also be referred to the description in the above embodiment. The purpose is to enable the light board 531 to move relative to the fixed base 10, thereby allowing the depth at which the light source extends into the swimming pool to be adjusted. The specific structure will not be further repeated here.

The present disclosure further provides a solar-powered pool system, which includes a swimming pool and a solar-powered pool wall-mounted light. The specific structure of the solar-powered pool wall-mounted light refers to the above-mentioned embodiment. Since the solar-powered pool system adopts all the technical solutions of all the above-mentioned embodiments, it at least has all the beneficial effects brought by the technical solutions of the above-mentioned embodiments, which will not be repeated herein. The solar-powered pool wall-mounted light is mounted at the edge of the swimming pool. In addition to the swimming pool and the solar-powered pool wall-mounted light, the solar-powered pool system can also include a pool purification system and other pool accessories.

The above descriptions are merely optional embodiments of the present disclosure and do not thereby limit the scope of the invention. Any equivalent structural transformations made under the inventive concept of the present disclosure, utilizing the contents of the specification and accompanying drawings, or directly/indirectly applied in other related technical fields, are all included within the scope of patent protection of the present disclosure.

What is claimed is:

1. A solar-powered pool wall-mounted light, comprising:
- a fixed base, configured to be secured to an edge of a swimming pool, comprising a mounting surface and a first channel extending from an interior of the fixed base to the mounting surface;
- a solar panel mounted on the mounting surface, and the solar panel being exposed outside the swimming pool when the solar pool wall-mounted light is in operation;
- a lighting assembly, comprising a housing and a lighting lamp set arranged inside the housing, at least a portion of the lighting assembly being configured to extend into the swimming pool to provide illumination, and the housing having a second channel connecting the lighting lamp set to an exterior of the housing; and a flexible electrical connector with one end thereof being connected to the solar panel through the first channel and the other end thereof being electrically connected to the lighting lamp set through the second channel;

wherein the housing is rotatably connected to the fixed base, allowing the solar-powered pool wall-mounted light to have both an expanded state and a folded state; when the solar-powered pool wall-mounted light is in the expanded state, the housing is substantially perpendicular to the mounting surface; when the solar-powered pool wall-mounted light is in the folded state, the housing is substantially parallel with the mounting surface, thereby reducing a space enclosed by the fixed base and the lighting assembly;

the lighting assembly comprises a control switch, a button board, and a light panel assembly; the button board is electrically connected to the control switch and the light panel assembly, and the control switch controls the light panel assembly through the button board;

the control switch is mounted at the end of the housing close to the fixed base, and is exposed on the housing; and the button board is located inside the housing and is arranged corresponding to the control switch, and the button board is electrically connected to the light panel assembly through a flexible electrical connection structure.

2. The solar-powered pool wall-mounted light according to claim 1, wherein the fixed base comprises a clamping assembly; the clamping assembly comprises the clamping space and a clamping opening communicating with the clamping space, and the clamping space and the clamping opening are configured to be clamped to the edge of the swimming pool; and when the solar-powered pool wall-mounted light is in the expanded state, the clamping opening is opened for the edge of the swimming pool to enter and exit the clamping space; when the solar-powered pool wall-mounted light is in the folded state, the housing covers the clamping opening.

3. The solar-powered pool wall-mounted light according to claim 1, wherein the fixed base comprises a base seat and a clamping portion, the base seat comprises a base plate assembly and a connecting portion arranged on the base plate assembly, and the clamping portion and the connecting portion are capable of moving relative to each other to adjust a size of a clamping space formed between the clamping portion and the connecting portion; and the clamping portion and/or the connecting portion are foldable relative to the base plate assembly.

4. The solar-powered pool wall-mounted light according to claim 1, wherein the connecting portion is fixedly connected to the base plate assembly, and the clamping portion is movably mounted on the base plate assembly; and the housing is pivotally connected to the connecting portion, and when the solar-powered pool wall-mounted light is in the folded state, the housing folds towards the clamping portion.

5. The solar-powered pool wall-mounted light according to claim 4, wherein a distance between a position where the housing is pivotally connected to the connecting portion and the mounting surface is less than a distance between a free end of the clamping portion and the mounting surface; and the connecting portion is foldable relative to the base plate assembly; when the solar-powered pool wall-mounted light is in the folded state, the connecting portion is folded to avoid the housing, and the housing is folded outside the connecting portion.

6. The solar-powered pool wall-mounted light according to claim 4, wherein a distance between a position where the housing is pivotally connected to the connecting portion and the mounting surface is greater than or equal to a distance between a free end of the clamping portion and the mounting surface.

7. The solar-powered pool wall-mounted light according to claim 1, wherein the connecting portion is fixedly connected to the base plate assembly, and the housing is pivotally connected to the connecting portion; when the solar-powered pool wall-mounted light is in the folded state, the housing folds towards the clamping portion, and the clamping portion folds towards the connecting portion; and the base plate assembly is provided with a first sliding groove, the clamping portion is provided with a first sliding block, the first sliding block slidably engages with the first sliding groove, and the clamping portion is slidably connected to the base plate assembly; or the base plate assembly is provided with a second sliding block, the clamping portion is provided with a second sliding groove, the second sliding block slidably engages with the second sliding groove, and the clamping portion is slidably connected to the base plate assembly; or the base plate assembly is provided with a first sliding groove, the base plate assembly is provided with a second sliding block, the clamping portion is provided with a second sliding groove, and the clamping portion is provided with a first sliding block; the first sliding block slidably engages with the first sliding groove, the second sliding block slidably engages with the second sliding groove, and the clamping portion slidably engages with the base plate assembly.

8. The solar-powered pool wall-mounted light according to claim 7, wherein the clamping portion comprises a sliding bracket and a clamping block, the sliding bracket is slidably connected to the base plate assembly, and the clamping block is rotatably connected to the sliding bracket.

9. The solar-powered pool wall-mounted light according to claim 8, wherein the base plate assembly comprises a base plate and a guide plate fixedly connected to the base plate; the sliding bracket comprises a sliding bottom plate and a connecting lug arranged on the sliding bottom plate, the clamping block is rotatably connected to the connecting lug, and the sliding bottom plate slidably engages with the guide plate;

the sliding bottom plate is provided with an exposure hole;

several positioning ribs arranged at intervals on a plate surface of the guide plate facing the clamping portion, extending along a length direction of the plate surface;

the sliding bracket further comprises an adjustment knob having a knob portion and an adjustment portion; the knob portion is exposed on the sliding bottom plate through the exposure hole, and the adjustment portion is located on one side of the sliding bottom plate facing the guide plate; and the adjustment portion comprises a spiral rib configured to engage with the positioning ribs, such that the spiral rib can switch to engage with different positioning ribs when rotating with the knob portion, thereby adjusting a position of the clamping portion on the guide plate.

10. The solar-powered pool wall-mounted light according to claim 8, wherein the sliding bracket comprises a sliding bottom plate and a connecting lug arranged on the sliding bottom plate, the clamping block is rotatably connected to the connecting lug, and the sliding bottom plate slidingly engages with the base plate assembly; and the sliding bottom plate and the base plate assembly are enclosed to form an installation cavity in which an elastic member is arranged; when the clamping block moves towards the connecting portion, an elastic potential energy of the elastic member decreases; when the sliding block moves away from the connecting portion, the elastic potential energy of the elastic member increases.

11. The solar-powered pool wall-mounted light according to claim 1, wherein the fixed base comprises a base seat, and the base seat comprises a base plate assembly and a connecting portion arranged on the base plate assembly, and the connecting portion is rotatably connected to the housing, such that the lighting assembly can rotate and fold with the base; and the base plate assembly has a fixing surface, the fixing surface and the mounting surface are located on opposite sides of the base plate assembly, and the fixing surface is configured to conformally secured to the edge of the swimming pool.

12. The solar-powered pool wall-mounted light according to claim 1, wherein one of the housing and the fixed base has a rotation hole, and the other has a rotation shaft, and the rotation shaft is inserted into the rotation hole and rotatably engages with the rotation hole; and the rotation shaft has a hollow structure to form a wiring hole, the wiring hole connects the first channel and the second channel to allow the flexible electrical connector to extend from one of the first channel and the second channel to the other.

13. The solar-powered pool wall-mounted light according to claim 12, wherein the fixed base comprises a base seat, and the base seat comprises a base plate assembly and a connecting portion arranged on the base plate assembly;

the connecting portion has an insertion slot, and the housing has an insertion portion inserted into the insertion slot; and one of the rotation hole and the rotation shaft is located on the insertion portion, while the other is located on an inner side wall of the insertion slot.

14. The solar-powered pool wall-mounted light according to claim 13, wherein the first channel comprises a first vertical portion and a first horizontal portion, the first vertical portion extends from the solar panel to one end of the wiring hole, and the first horizontal portion is either the rotation hole or the wiring hole; or the first channel comprises a second vertical portion, a second horizontal portion, a third vertical portion, and a fourth horizontal portion connected in sequence; the second vertical portion extends from the solar panel to the insertion slot, the second horizontal portion extends from the insertion slot into the side wall of the insertion slot, the third vertical portion extends from the second horizontal portion to one end of the wiring hole, and the fourth horizontal portion is either the rotation hole or the wiring hole.

15. The solar-powered pool wall-mounted light according to claim 1, wherein the fixed base comprises a base seat, and the base seat comprises a base plate assembly and a connecting portion arranged on the base plate assembly;

the connecting portion has an insertion slot, the housing has an insertion portion inserted into the insertion portion;

when the solar-powered pool wall-mounted light is in the expanded state, the control switch is located in the insertion slot, an auxiliary button is arranged on a side wall of the insertion slot corresponding to the control switch, and the auxiliary button is configured to control the light panel assembly by pressing the control switch; and when the solar-powered pool wall-mounted light is in the folded state, the control switch is exposed on the insertion slot.

16. The solar-powered pool wall-mounted light according to claim 1, wherein the light panel assembly comprises an electronic control board and a light board, and the electronic control board is electrically connected to the light board; and the light board is shaped as a boss, and comprises a main lighting surface and at least one side lighting surface, wherein the at least one side lighting surface is arranged obliquely relative to the main lighting surface.

17. The solar-powered pool wall-mounted light according to claim 1, wherein the housing comprises a first housing and a second housing; the first housing is rotatably connected to the fixed base, while the second housing is movably connected to the first housing, allowing the second housing to move along a length direction of the first housing, thereby adjusting a distance between the second housing and the fixed base; and the lighting lamp set is arranged inside the second housing and is capable of moving along with the second housing, such that a depth at which the lighting lamp set extends into the swimming pool can be adjusted; or the lighting assembly comprises a control switch, a button board, and a light panel assembly; the button board is electrically connected to the control switch and the light panel assembly, and the control switch controls the light panel assembly through the button board; the control switch and the button board are mounted on the first housing, and the light panel assembly is mounted on the second housing, allowing the light panel assembly to move as the second housing extends or retracts, such that a depth at which the light panel assembly extends into the swimming pool can be adjusted.

18. A solar-powered pool system, comprising a swimming pool and the solar-powered pool wall-mounted light according to claim 1, and the solar-powered pool wall-mounted light is mounted at the edge of the swimming pool.

* * * * *